US010637363B2

(12) United States Patent
Wang et al.

(10) Patent No.: US 10,637,363 B2
(45) Date of Patent: Apr. 28, 2020

(54) CONVERTERS WITH HOLD-UP OPERATION

(71) Applicant: Murata Manufacturing Co., Ltd., Nagaokakyo-shi, Kyoto-fu (JP)

(72) Inventors: Hongliang Wang, Markham (CA); Yang Chen, Markham (CA); Yan-Fei Liu, Markham (CA); Jahangir Afsharian, Markham (CA); Zhihua Yang, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/757,548

(22) PCT Filed: Sep. 16, 2016

(86) PCT No.: PCT/US2016/052278
§ 371 (c)(1),
(2) Date: Mar. 5, 2018

(87) PCT Pub. No.: WO2017/049179
PCT Pub. Date: Mar. 23, 2017

(65) Prior Publication Data
US 2018/0248489 A1    Aug. 30, 2018

Related U.S. Application Data

(60) Provisional application No. 62/220,465, filed on Sep. 18, 2015.

(51) Int. Cl.
*H02M 3/335* (2006.01)
*H02M 7/217* (2006.01)
(Continued)

(52) U.S. Cl.
CPC ... *H02M 3/33592* (2013.01); *H02M 3/33507* (2013.01); *H02M 7/217* (2013.01);
(Continued)

(58) Field of Classification Search
CPC ......... H02M 3/33507; H02M 3/33569; H02M 2007/4815; H02M 2007/4818; Y02B 70/1433; Y02B 70/1441
(Continued)

(56) References Cited

U.S. PATENT DOCUMENTS 7,012,380 B2 * 3/2006 Price .................. H05B 41/2828
315/209 R
8,611,115 B2   12/2013 Figge et al.
(Continued)

FOREIGN PATENT DOCUMENTS

CN      1747308 A      3/2006
CN    101093961 A    12/2007
(Continued)

OTHER PUBLICATIONS

Official Communication issued in International Patent Application No. PCT/US2016/052278, dated Dec. 19, 2016.
(Continued)

*Primary Examiner* — Nguyen Tran
*Assistant Examiner* — Monica Mata
(74) *Attorney, Agent, or Firm* — Keating & Bennett, LLP

(57) ABSTRACT

A converter includes a half-bridge circuit including first and second transistors that are connected in series, the half-bridge circuit is connected in parallel with a voltage input and includes a node connected to both the first and second transistors; a resonant inductor connected to the half-bridge circuit and the primary winding of a transformer; a resonant capacitor connected to the half-bridge circuit and the primary winding; a third transistor with a first terminal con-
(Continued)

nected to the half-bridge circuit and a second terminal directly connected to a first terminal of the resonant inductor; and a rectification stage that is connected to the secondary winding of the transformer and that includes first and second synchronous rectifiers. The rectification stage does not use discrete diodes to provide rectification, and during voltage boost operation, the third transistor is turned on and off to maintain an output voltage level.

20 Claims, 29 Drawing Sheets

(51) Int. Cl.
  *H02M 1/00* (2006.01)
  *H02M 1/32* (2007.01)
(52) U.S. Cl.
  CPC ........... *H02M 2001/0058* (2013.01); *H02M 2001/325* (2013.01); *Y02B 70/1433* (2013.01); *Y02B 70/1475* (2013.01); *Y02B 70/1491* (2013.01)
(58) Field of Classification Search
  USPC ..................................... 363/17, 21.02, 21.03
  See application file for complete search history.

(56) References Cited

U.S. PATENT DOCUMENTS

| | | |
|---|---|---|
| 2006/0187686 A1 | 8/2006 | Sun et al. |
| 2010/0097826 A1 | 4/2010 | Xu et al. |
| 2010/0328968 A1 | 12/2010 | Adragna et al. |
| 2012/0063174 A1 | 3/2012 | Kuwabara et al. |
| 2013/0194831 A1 | 8/2013 | Hu |
| 2014/0247626 A1 | 9/2014 | Lee |
| 2014/0376272 A1 | 12/2014 | Miao |
| 2015/0263634 A1* | 9/2015 | Fu .................... H02M 3/33569 363/21.02 |

FOREIGN PATENT DOCUMENTS

| | | |
|---|---|---|
| CN | 101951152 A | 1/2011 |
| CN | 204304823 U | 4/2015 |
| JP | 2012-065414 A | 3/2012 |
| KR | 10-2013-0026714 A | 3/2013 |
| KR | 10-1492964 B1 | 2/2015 |
| WO | 2013/155272 A1 | 10/2013 |

OTHER PUBLICATIONS

Kim et al., "LLC Series Resonant Converter with Auxiliary Hold-Up Time Compensation Circuit", Proc. IEEE Energy Convers. Congr. Expo. Asia, 2011, May 30-Jun. 3, 2011, pp. 628-633.
Kim et al., "LLC Series Resonant Converter with Auxiliary Circuit for Hold-Up Time", Proc. IEEE Int. Telecommun. Engergy Conf., 2009, 4 pages.
Kim et al., "Asymmetric PWM Control Scheme During Hold-Up Time for LLC Resonant Converter", IEEE Transactions on Industrial Electronics, vol. 59, No. 7, Jul. 2012, pp. 2992-2997.
Figge et al., "Overcurrent Protection for the LLC Resonant Converter with Improved Hold-Up Time", IEEE Applied Power Electronics Conference and Exposition, 2011, pp. 13-20.
Cho et al., "A Half-Bridge LLC Resonant Converter Adopting Boost PWM Control Scheme for Hold-Up State Operation", IEEE Transactions on Power Electronics, vol. 29, No. 2, Feb. 2014, pp. 841-850.
Official Communication issued in Chinese Patent Application No. 201680053678.3, dated Jul. 1, 2019.

* cited by examiner

US 10,637,363 B2

CONVERTERS WITH HOLD-UP OPERATION

BACKGROUND OF THE INVENTION

1. Field of the Invention

The present invention relates to high-efficiency power supplies and similar devices. More specifically, the present invention relates to resonant converters that perform a hold-up operation.

2. Description of the Related Art

In telecommunication power supplies and similar devices, the hold-up problem should be considered. When the input AC power is interrupted or lost, the output voltage of the power factor correction (PFC) stage continuously drops as the output capacitor(s) discharge. Hold-up time is the amount of time that a power supply can maintain an output voltage level within its rated output voltage range after the input AC power is interrupted or lost. The hold-up problem is how to increase the hold-up time as much as possible.

LLC series-resonant converters have been used because the primary switches can use zero-voltage switching (ZVS) and because there is no reverse-recovery problem for the rectifier diodes. Conventional LLC series-resonant converters are not able to solve the hold-up problem, although they can achieve high efficiency.

A two-stage AC/DC converter is shown in FIG. 1. The circuit shown in FIG. 1 can be used with known converters and with converters according to preferred embodiments of the present invention. The two-stage AC/DC converter includes a power factor correction (PFC) stage and a DC/DC stage and has been widely used for numerous industrial applications. FIG. 1 shows the block diagram of a two-stage AC/DC converter. The PFC stage can achieve high power factor, and the output voltage $V_{bus}$ can meet the requirements of the DC/DC stage. LLC series-resonant converter topology is used to achieve high efficiency and high power density because the topology can use ZVS on the primary side and use zero-capacitance switching (ZCS) on the secondary side. The synchronous rectifiers (SR) have been widely adopted in low-output-voltage applications to reduce the conduction loss of the output rectifier, which improves efficiency. Because the LLC series-resonant converter is a current-fed topology and has no output inductor, the voltage stress on the output rectifier is much lower than in conventional voltage-fed topologies. Low-voltage rated metal-oxide-semiconductor field-effect transistors (MOSFETs) can be used as the synchronous rectifiers SR to achieve high efficiency. Thus, a LLC series-resonant converter with synchronous rectifiers SR is an ideal topology to achieve high efficiency in low-output-voltage applications. The output voltage should be maintained for a certain period after loss of the AC voltage, called a hold-up period as shown in FIG. 2. During the hold-up period, the stored energy capacitor $C_{bus}$ provides power for the LLC series-resonant converter. Thus, the DC/DC stage should provide enough voltage gain to keep the output voltage of the LLC series-resonant converter stable.

An LLC series-resonant converter regulates the output voltage by decreasing the switching frequency, assuming that the converter is operated in an inductive region. LLC series-resonant converters with wide input voltage ranges should have a small magnetizing inductance to achieve a high peak gain. This small magnetizing inductance causes large conduction losses on the primary side. Thus, it is difficult to obtain an optimal design that has a wide input voltage range and achieves a flat efficiency curve. To obtain good performance during operation and to satisfy the voltage gain requirement during the hold-up period, many methods have been developed for hold-up operation based on an LLC series-resonant converter.

A first known method of providing hold-up operation uses an additional secondary-side winding to increase the number of secondary turns during hold-up operation. The additional winding is connected in series with the secondary-side winding of the transformer. A diode and a switch can be used to connect and to disconnect the additional winding.

FIG. 3 shows a known LLC converter using the first known method of providing hold-up operation. This known converter includes a primary side and a secondary side. The primary side is the side of the converter located between DC input $V_{in}$ and transformer. The secondary side is the side of the converter located between the transformer and the output voltage $V_O$.

The primary circuit includes primary switches $Q_1$, $Q_2$, resonant inductor $L_r$, resonant capacitor $C_r$, and inductor $L_m$. The primary switches $Q_1$, $Q_2$ are connected to DC input $V_{in}$. The resonant inductor $L_r$ and the resonant capacitor $C_r$ are connected in series with each other and are connected between the primary windings of the transformer T and a node between the primary switches $Q_1$, $Q_2$. Inductor $L_m$, is connected in parallel across the primary windings of the transformer T. The voltage $V_{Lr}$ is the voltage across the resonant inductor $L_r$, and the current $i_{Lr}$ is the current through the resonant inductor $L_r$. The voltage $V_{Cr}$ is the voltage across the resonant capacitor $C_r$. The current $i_{Lm}$ is the current through the inductor $L_m$. The secondary circuit includes rectifying diodes $D_1$, $D_2$, $D_3$, $D_4$ arranged in a bridge, resistance $R_O$, and output capacitor $C_O$. The current $I_{rect}$ is the current from the rectifier bridge. Resistance $R_O$ represents the resistance of the output. The above described component are typical of LLC converters.

The secondary circuit also includes an auxiliary winding $N_a$. Series connected diode $D_5$ and switch $Q_3$ are connected between the auxiliary winding $N_a$ and the output. Increasing the secondary turns during hold-up operation, the converter can achieve higher voltage gain than a traditional LLC converter. However, additional transformer windings means a larger transformer size, and including switch $Q_3$ and diode $D_5$ results in lower power density and higher costs.

As shown in FIGS. 3 and 4 of Kim et al., "LLC series resonant converter with auxiliary hold-up time compensation circuit," Proc. IEEE Energy Conyers. Congr. Expo. Asia; 2011; pp. 628-633, during normal operation, the additional switch is open, and the additional winding is not connected. During holdup operation, the additional switch is turned on, and the winding is connected. In this way, the number of secondary-side turns is increased. A drawback with this method is that the turns ratio is not smoothly changed, such as 17:1 to 16:1. Thus, the output voltage jumps when the turns ratio changes. Adding an additional transformer winding increases the transformer size, and an additional diode and the additional switch decrease the power density and increase complexity.

FIG. 4 shows a known LLC converter with a secondary auxiliary circuit that provides ZVS to the transformer. The secondary circuit only includes two rectifying diodes $D_1$, $D_2$ and includes auxiliary windings, in which each of the auxiliary windings are connected to an inductor connected in series with a diode $D_4$ or $D_5$ and includes a switch and a diode connected to the rectifying diodes $D_1$, $D_2$. Although this known converter can achieve higher voltage gain, the secondary auxiliary circuit of this converter has many bulky components and is not suitable for low-output voltage applications in which a synchronous-rectifier MOSFET is required.

A second known method of providing hold-up operation uses a pulse-width modulation (PWM) control scheme to boost the primary current. This second known method can increase the voltage gain without using any additional components, but requires changing of the control scheme from pulse frequency modulation (PFM) control to PWM control during hold-up operation. High-voltage gain is achieved while maintaining high power density. Improved topology using the auxiliary switch can solve the drawback discussed above with respect to the first known method in which the output voltage jumps when the turns ratio changes. In the second known method, the additional switch is controlled in a PWM mode. The output voltage can be smoothly changed by adjusting the duty cycle.

The auxiliary switch works in PWM control, and the main switch of the converter also works in PFM during hold-up operation. However, the second method is only suitable for diode rectifiers because the second known method short circuits when synchronous rectifiers are used instead of diode rectifiers. Thus, the second method is not suitable for low-voltage, high-current output applications.

FIG. 5 shows a known converter that uses the second known method of providing hold-up operation. An asymmetric PWM control method is used. As shown in FIG. 5, the gate signals for the primary switches Q1, Q2 are of different lengths. The converter in FIG. 5 does not need an additional circuit. The voltage gain can be increased only using the asymmetric PWM control method, but achieving enough gain for hold-up operation is difficult, as explained in Kim et al., "Asymmetric PWM control scheme during hold-up time for LLC resonant converter," IEEE Trans. Ind. Electron.; Vol. 59, No. 7; July 2012; pp. 2992-2997.

FIGS. 6 and 7 show two known LLC converters using boost PWM control methods. The boost PWM control methods operate in a narrow switching frequency variation within a wide input voltage range. Also, it is possible to obtain optimal design during normal operation because of the boost PWM control methods decouple normal operation and hold-up operation The LLC converters' normal and hold-up operations are decoupled because the LLC converters rely on PFM, in which the switching frequency is changed to regulate the output voltage, during normal operation and rely on PWM, in which the switching frequency is fixed and the duty cycle is changed to regulate the output voltage, during hold-up operation. Thus, boost PWM control only works during hold-up operation, which allows decoupling of normal and hold-up operations. But the boost PWM control methods are not suitable for low-output voltage applications with synchronous rectifiers SR because of the risk of short-circuiting. In FIGS. 6 and 7, two secondary rectifier diodes and two synchronous rectifiers $SR_1$, $SR_2$ are used. If the two diodes are replaced with synchronous rectifiers, then short-circuit condition will happen.

FIG. 8 shows another known converter with four rectifying diodes and with a switch Q3 on the primary side connected in parallel with the resonant inductor $L_r$ and the resonant capacitor $C_r$. A short circuit condition would also happen with this boost PWM control method if the rectifying diodes are replaced with synchronous-rectifier MOSFETs. Once switches Q2, Q3 are turned on, the primary-side of the transformer is short-circuited. The rectifying diodes are required in the secondary circuit.

SUMMARY OF THE INVENTION

To overcome the problems described above, preferred embodiments of the present invention provide an improved LLC resonant converter and method that works during hold-up operation, that is suitable for low-voltage, high-current applications in which synchronous rectifiers are used on the secondary side, and that uses only one additional switch (or one switch and one diode), which adds little cost.

According to a preferred embodiment of the present invention, a converter includes a voltage input; a transformer including primary and secondary windings; a voltage output; a primary circuit connected to the voltage input and to the primary winding, the primary circuit including a half-bridge circuit including first and second transistors that are connected in series, the half-bridge circuit is connected in parallel with the voltage input and includes a node connected to both the first and second transistors, a resonant inductor connected to the half-bridge circuit and the primary winding, a resonant capacitor connected to the half-bridge circuit and the primary winding, and a third transistor with a first terminal connected to the half-bridge circuit and a second terminal directly connected to a first terminal of the resonant inductor; and a secondary circuit connected to the secondary winding and to the voltage output, the secondary circuit including a rectification stage that is connected to the secondary winding and that includes first and second synchronous rectifiers. The rectification stage does not use discrete diodes to provide rectification, and during voltage boost operation, the third transistor is turned on and off to maintain an output voltage level.

The converter further preferably includes a diode connected to the third transistor.

Preferably, the second terminal of the third transistor is also directly connected to a first terminal of the resonant capacitor, the first terminal of the resonant inductor and the first terminal of the resonant capacitor are connected such that the resonant capacitor is connected to the half-bridge circuit through the resonant inductor, a second terminal of the resonant inductor is connected to the node of the half-bridge circuit, and a second terminal of the resonant capacitor is connected to the primary winding.

The first terminal of the third transistor is also preferably connected to a negative terminal of the voltage input. The primary winding is preferably directly connected to the negative terminal of the input voltage or a positive terminal of the input voltage.

The first terminal of the third transistor is preferably also connected to a positive terminal of the voltage input. The primary winding is preferably directly connected to the negative terminal of the input voltage or a positive terminal of the input voltage.

Preferably, the second terminal of the third transistor is also directly connected to a first terminal of the resonant capacitor, the first terminal of the resonant inductor and the first terminal of the resonant capacitor are connected such that the resonant capacitor is connected to the half-bridge circuit through the resonant inductor, a second terminal of the resonant inductor is connected to a negative terminal of the input voltage, and a second terminal of the resonant capacitor is connected to the primary winding.

The first terminal of the third transistor is also preferably connected to a positive terminal of the voltage input. The converter further preferably includes a diode connected to the third transistor.

Preferably, the second terminal of the third transistor is also directly connected to a first terminal of the resonant capacitor, the first terminal of the resonant inductor and the first terminal of the resonant capacitor are connected such that the resonant capacitor is connected to the half-bridge circuit through the resonant inductor, a second terminal of the resonant inductor is connected to a positive terminal of the input voltage, and a second terminal of the resonant capacitor is connected to the primary winding.

The first terminal of the third transistor is also preferably connected to a negative terminal of the voltage input. The converter further preferably includes a diode connected to the third transistor.

Preferably, the second terminal of the third transistor is also connected to the primary winding, a first terminal of the resonant capacitor is connected to the node of the half-bridge circuit, and a second terminal of the resonant capacitor is connected to the primary winding.

Preferably, a second terminal of the resonant inductor is connected to a negative terminal of the input voltage, and the first terminal of the third transistor is also connected to a positive terminal of the input voltage. Preferably, a second terminal of the resonant inductor is connected to a positive terminal of the input voltage, and the first terminal of the third transistor is also connected to a negative terminal of the input voltage.

Voltage boost operation preferably occurs during a hold-up period when the input voltage is below a threshold voltage. During voltage boost operation, the resonant capacitor preferably boosts energy of the resonant inductor to maintain the output voltage level.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention provide half-bridge (HB) LLC converters that achieve increased voltage gain. The converters can operate at the maximum efficiency during normal operation, i.e., when the input voltage is within the nominal input voltage range. When the input voltage is low, an added switch starts to operate in PWM mode to increase the energy transferred from the DC input to the resonant tank, which is then transferred to the output, thereby increasing the voltage gain. This is particularly suitable for hold-up operation. Because normal operation and hold-up operation are decoupled, the switching frequency variation range is not wide, which results in high efficiency. A diode can be added in series with the added switch that interrupts the branch with the added switch to charge the parasitic capacitor of the added switch.

During normal operation, the added switch in the converters according to the preferred embodiments of the present invention does not turn on, and the converters operate like the traditional half-bridge LLC converters. The output voltage is controlled by switching frequency control. The switching frequency can be designed near the resonant frequency; thus, the can be optimized. When the input voltage is low, the converter can operate in voltage boost mode when primary switches operate at minimum switching frequency and the added switch in PWM mode to increase the energy transferred from the input source to the resonant tank, which increases the voltage gain. A hold-up period is the time that the input voltage is low.

Figure 1:
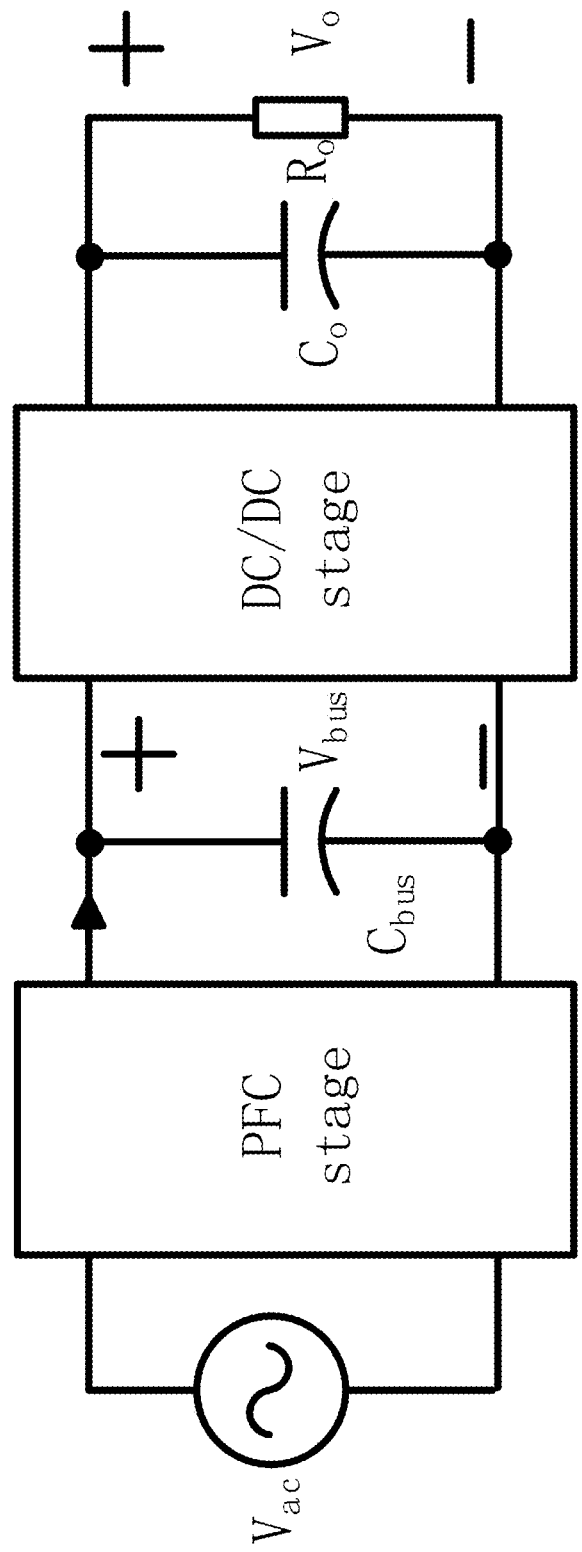
FIG. 1 shows a circuit with PFC and DC/DC stages.
Figure 2:
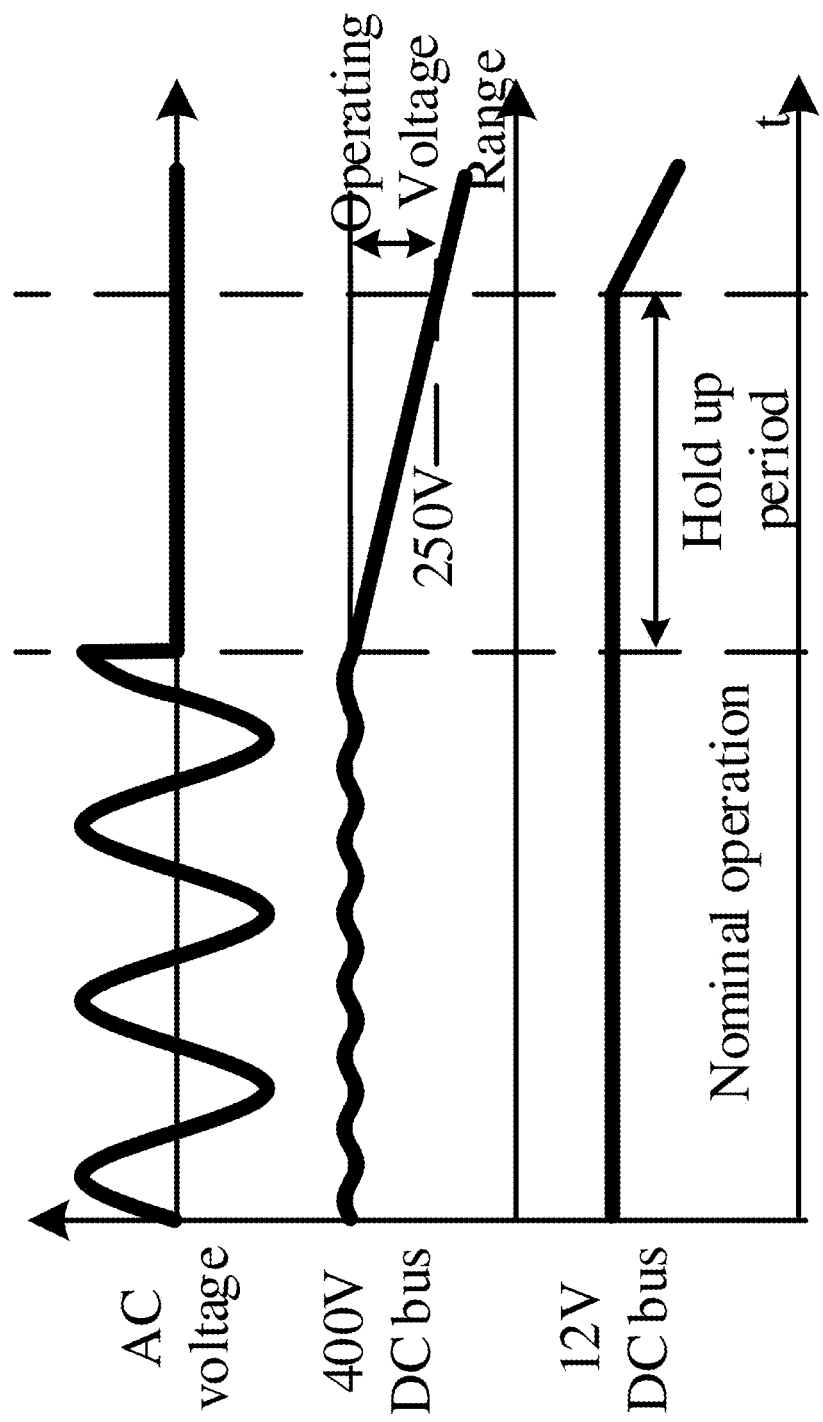
FIG. 2 shows voltage waveforms during normal and hold-up period operation.
Figure 3:
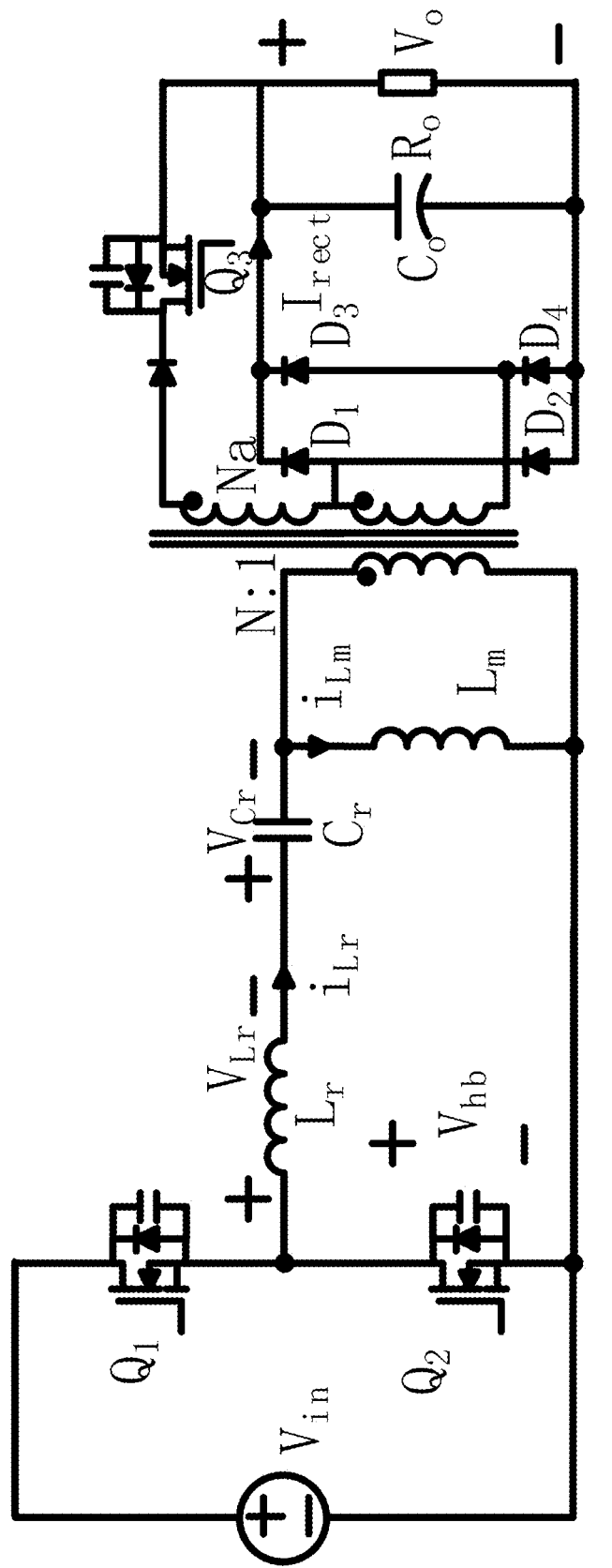
FIGS. 3-8 show known converters.
Figure 4:
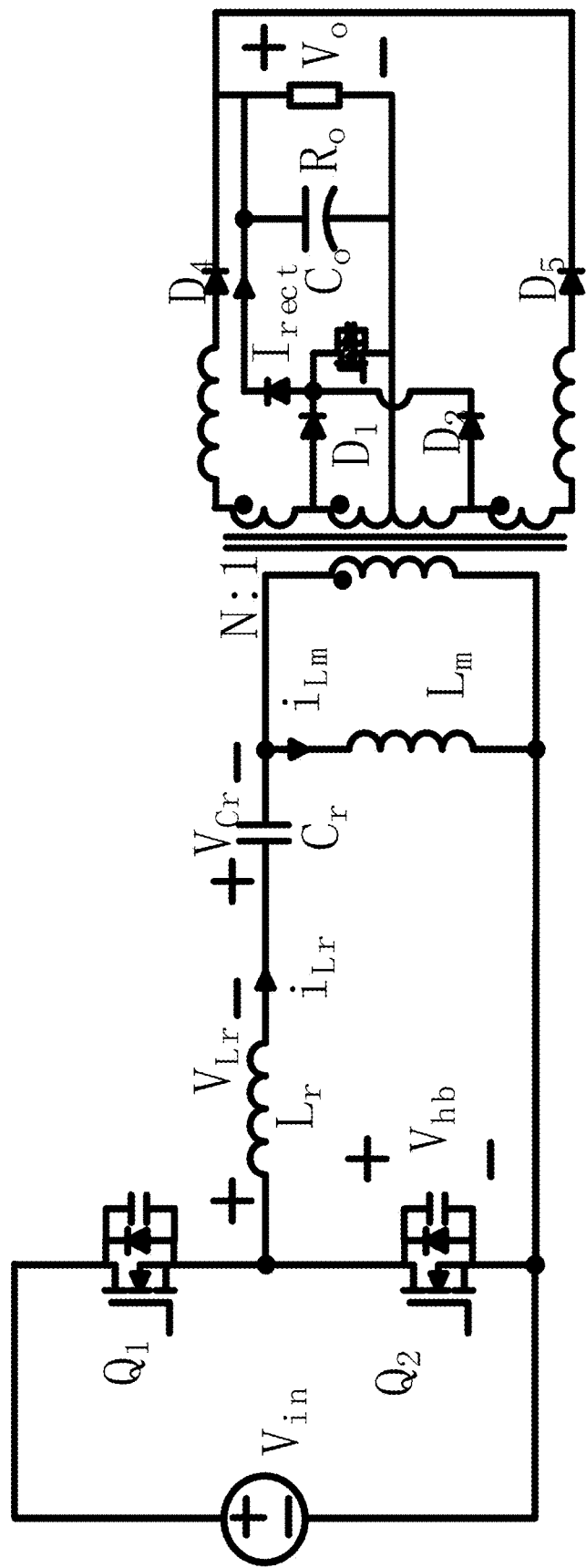
Figure 5:
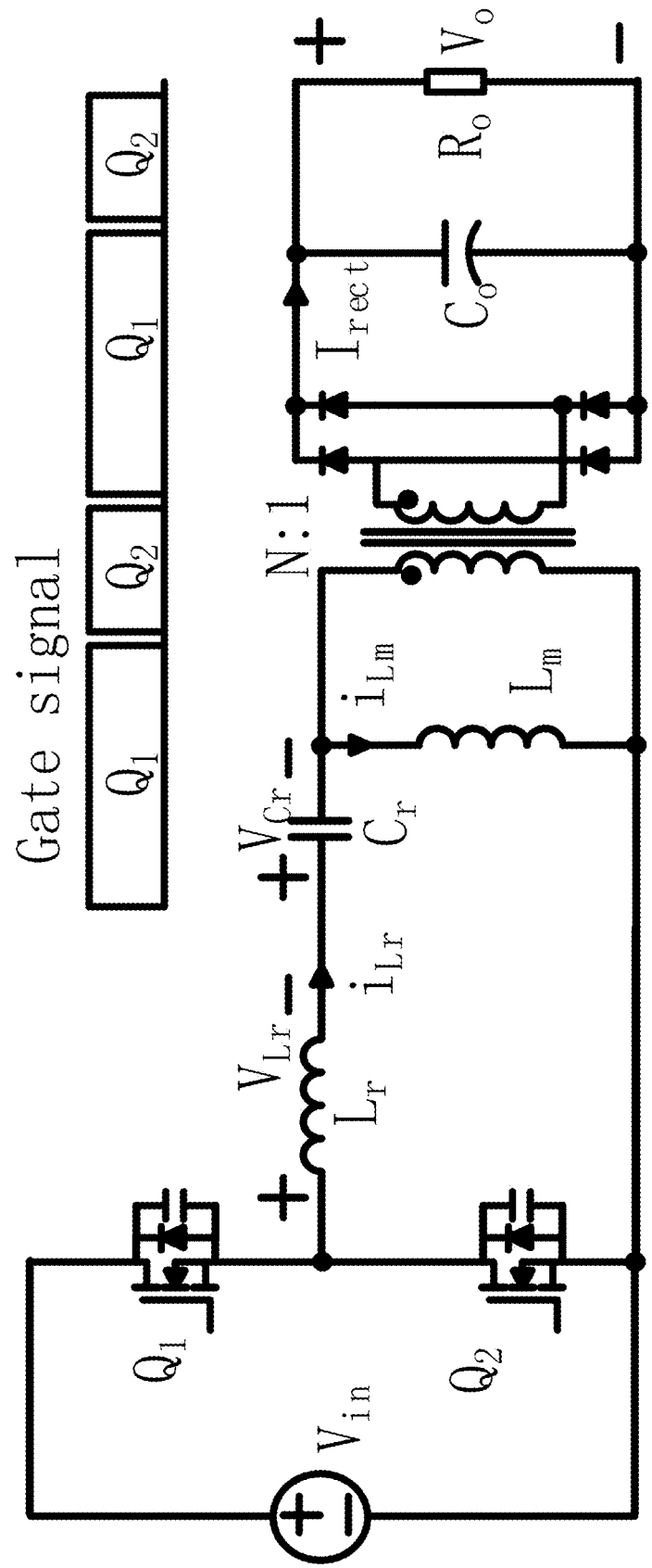
Figure 6:
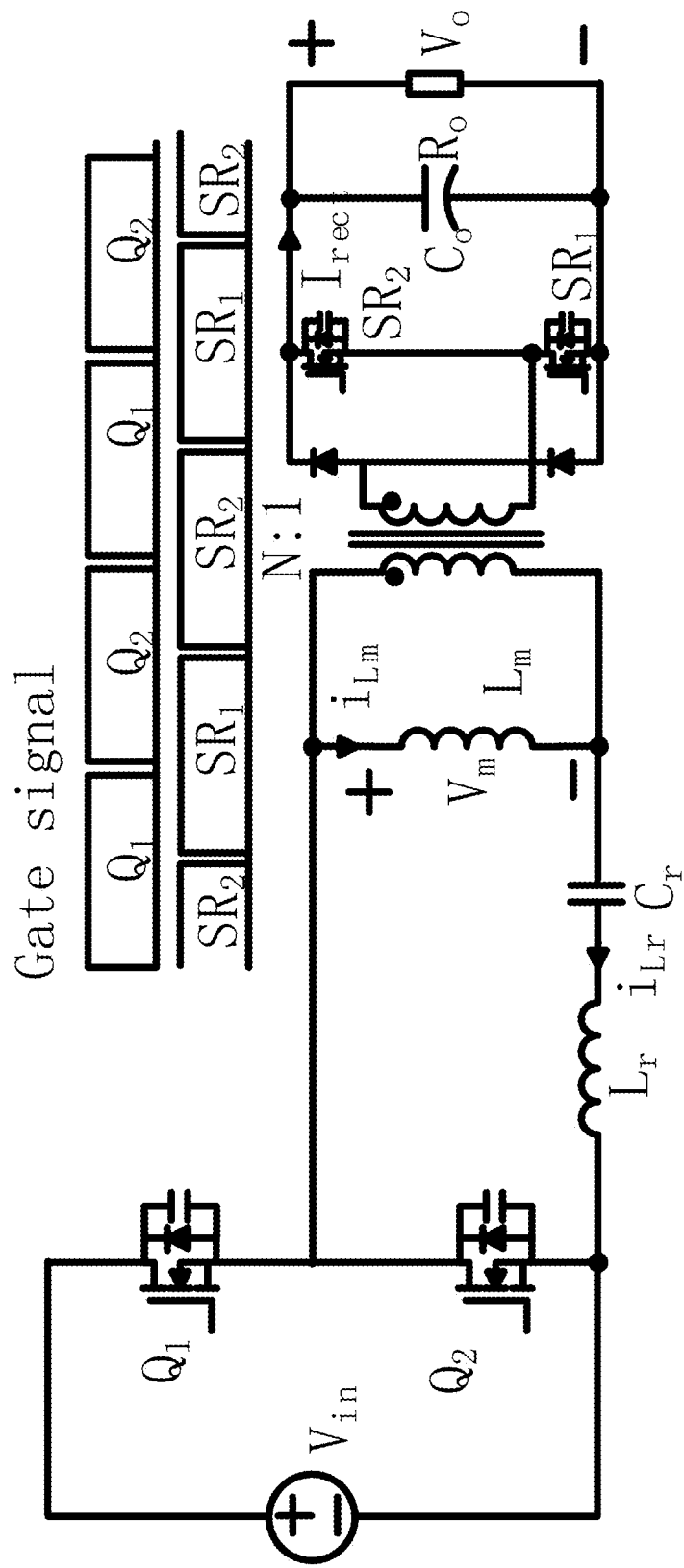
Figure 7:
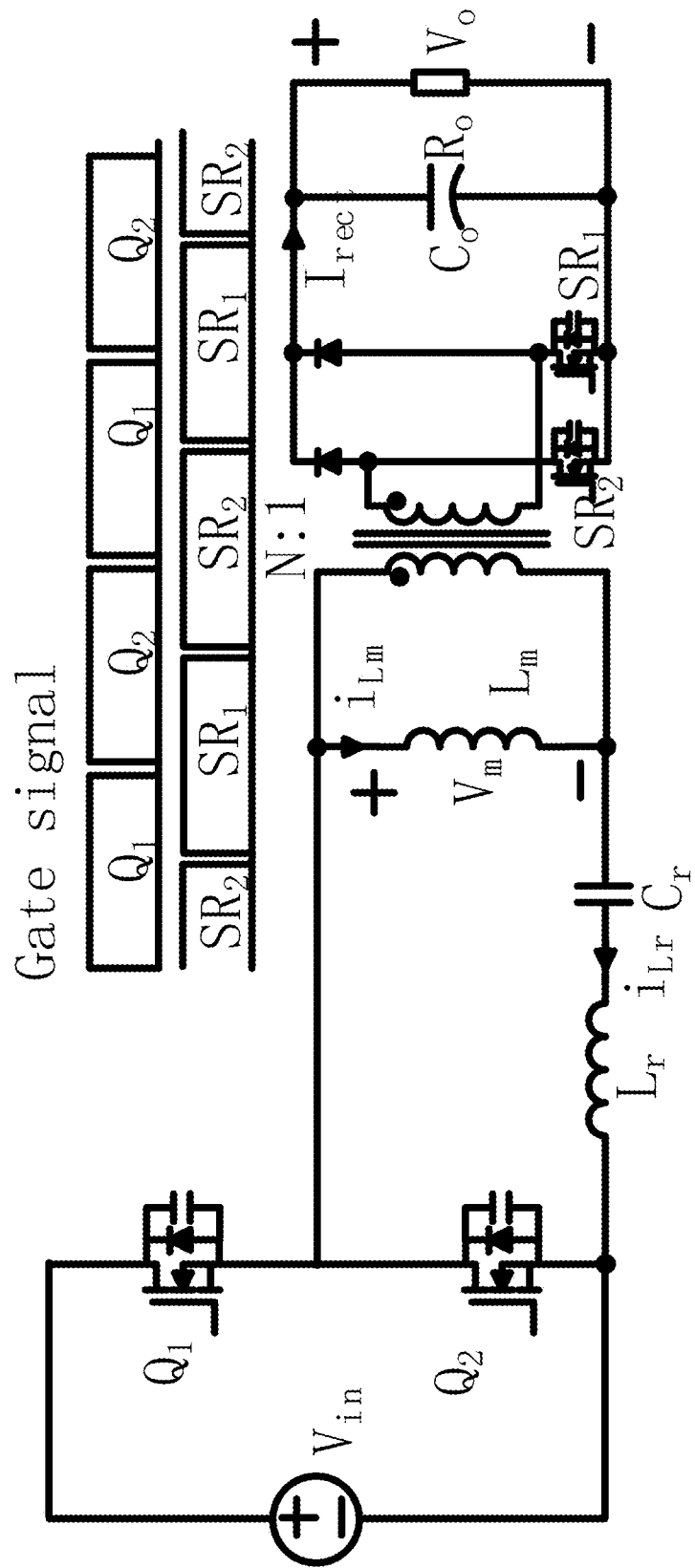
Figure 8:
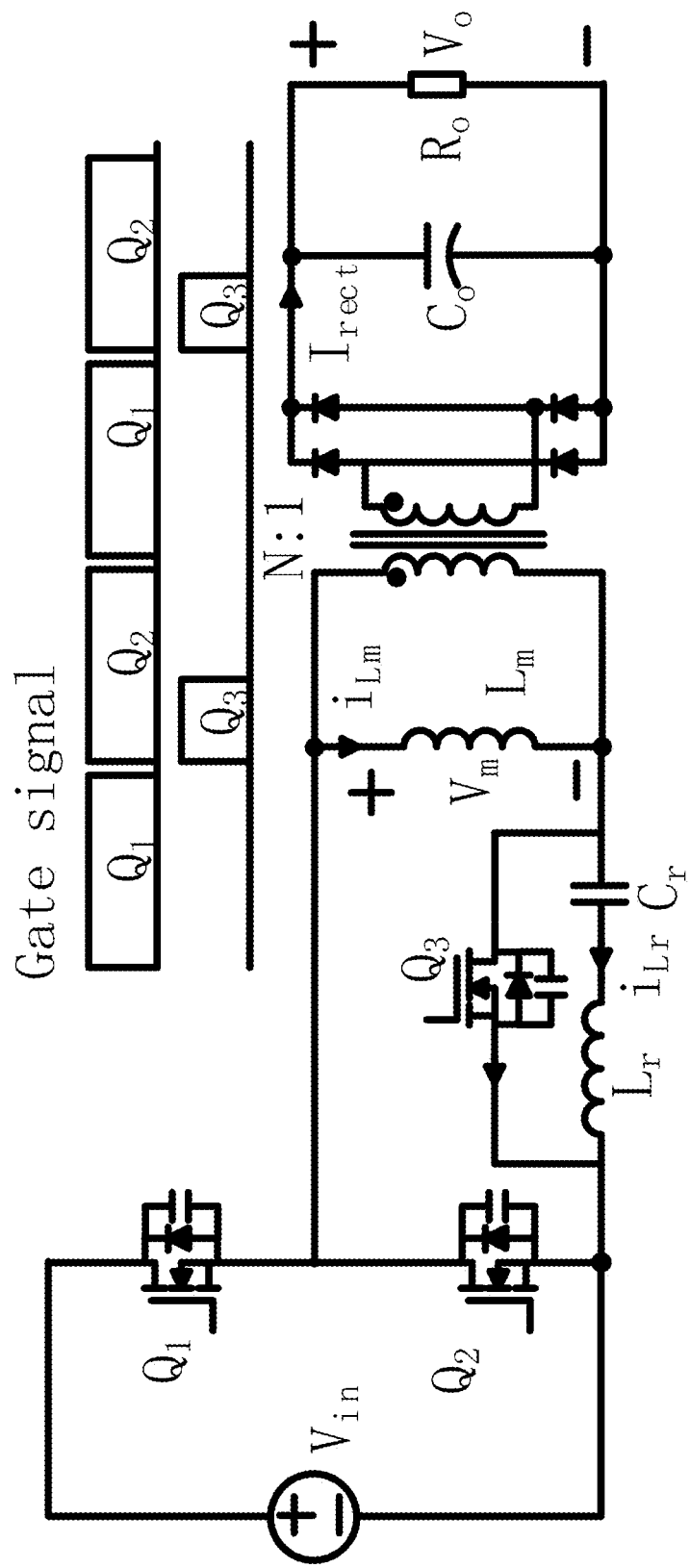
Figure 9:
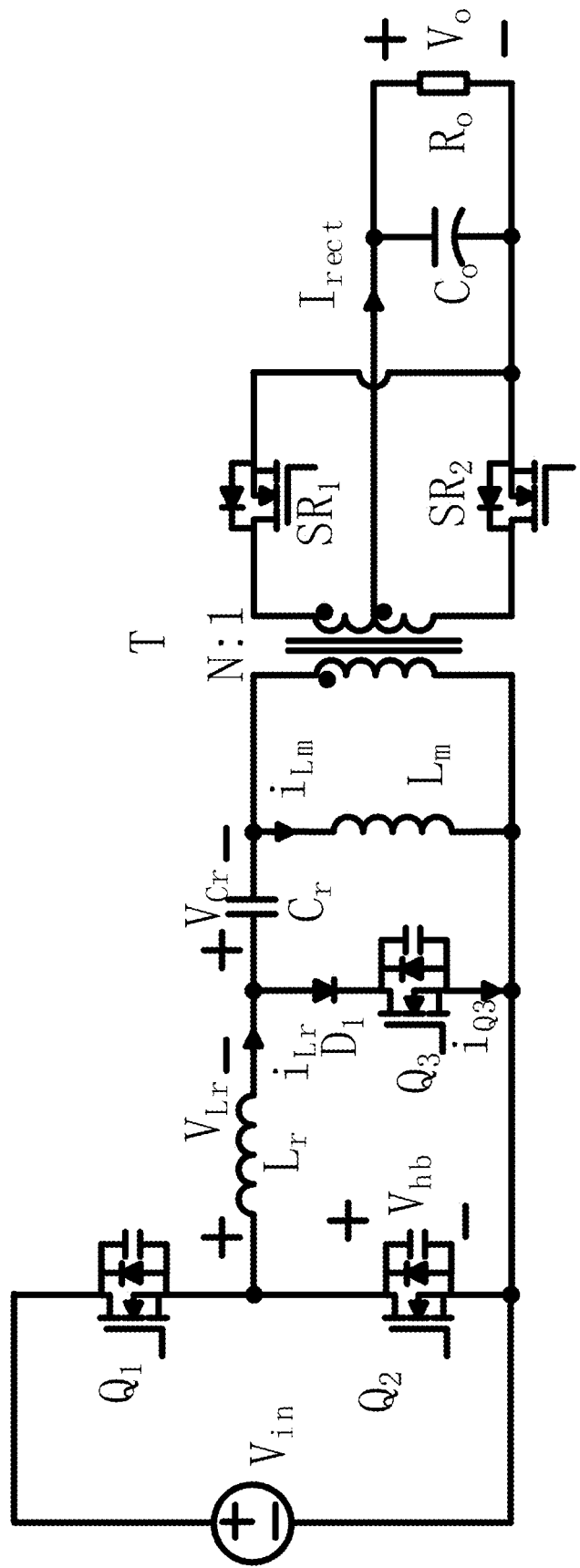
FIGS. 9-18 show converters according to first through tenth preferred embodiments of the present invention.

FIG. 9 shows a converter according to first preferred embodiment of the present invention. The converter shown in FIG. 9 can be used as the DC/DC stage in FIG. 1. The DC input $V_{in}$ in FIG. 9 corresponds to the voltage $V_{bus}$ on the capacitor $C_{bus}$ in FIG. 1.

The primary circuit includes primary switches $Q_1$, $Q_2$, resonant inductor $L_r$, resonant capacitor $C_r$, diode $D_1$, switch $Q_3$, and inductor $L_m$. The primary switches $Q_1$, $Q_2$ are connected to DC input $V_{in}$. The resonant inductor $L_r$ and resonant capacitor $C_r$ are connected in series with each other and are connected between the primary windings of the transformer T and a node between the primary switches $Q_1$, $Q_2$. Diode $D_1$ and switch $Q_3$ are connected in series with each other and are connected between the negative terminal of the input voltage $V_{in}$ and a node between the resonant inductor $L_r$ and resonant capacitor $C_r$. Inductor $L_m$ is connected in parallel across the primary windings of the transformer T. The transformer turns ratio is N. The voltage $V_{HB}$ is the voltage of the half-bridge. The voltage $V_{Lr}$ is the voltage across the resonant inductor $L_r$, and the current $i_{Lr}$ is the current through the resonant inductor $L_r$. The voltage $V_{Cr}$ is the voltage across the resonant capacitor $C_r$. The voltage $V_m$ is the voltage across the primary winding of the transformer T, and the current $i_{Lm}$ is the current through inductor $L_m$. The current $i_{Q3}$ is the current through auxiliary switch $Q_3$.

The secondary circuit includes synchronous rectifiers $SR_1$, $SR_2$, resistance $R_O$, and capacitor $C_O$. Synchronous rectifiers $SR_1$, $SR_2$ are connected to the secondary windings of the transformer T and define a rectifying stage that provides a rectified output at the output voltage $V_O$. The rectifying stage does not include or use diodes to provide a rectified output. Resistance $R_O$ represents the resistance of the output. The current $I_{rect}$ is the current from the rectifying stage.

In FIG. 9, the converter includes one switch $Q_3$ (or one switch $Q_3$ and one diode $D_1$). The switch $Q_3$ only works during hold-up operation. In normal operation, the switching frequency of the primary switches $Q_1$, $Q_2$ is reduced as the input voltage decreases. Once the switching frequency is reduced to a set minimum frequency, the duty ratio of the switch $Q_3$ is increased from zero with the switching frequency of the primary switches $Q_1$, $Q_2$ fixed, starting hold-up operation. Thus, the converter can be designed according to normal operation. When the switch $Q_3$ is on, the inductor $L_r$ can be charged, which transmits a large amount of energy to the secondary side. Thus, the gain is increased. When the DC input $V_{in}$ is off, the voltage of the input DC bus capacitor (not shown but would be connected in parallel with the DC input $V_{in}$) is reduced, and the auxiliary switch $Q_3$ charges the resonant inductor $L_r$ so that the output voltage $V_O$ can be kept constant. Thus, the hold-up time can be increased.

Because the capacitor $C_r$ is connected between the transformer T and the charging circuit, i.e., is connected by either one switch $Q_3$ or one switch $Q_3$ and one diode $D_4$, the DC/DC converter is suitable for synchronous rectifier application. In synchronous-rectifier applications, the short circuit of the primary-side of the transformer must be avoided because the synchronous rectifier can provide bi-directional current. Known auxiliary-switch methods short the transformer to boost the inductor and to keep the output voltage constant during hold-up operation. Shorting the transformer is only suitable for diode-rectifier applications. In synchronous-rectifier applications, a resonant capacitor in series with the transformer during hold-up operation can boost the energy of inductor Lr to keep the output voltage constant. The resonant capacitor does not directly short the primary-side of transformer and is suitable for both diode-rectifier applications and synchronous-rectifier applications.

Figure 10:
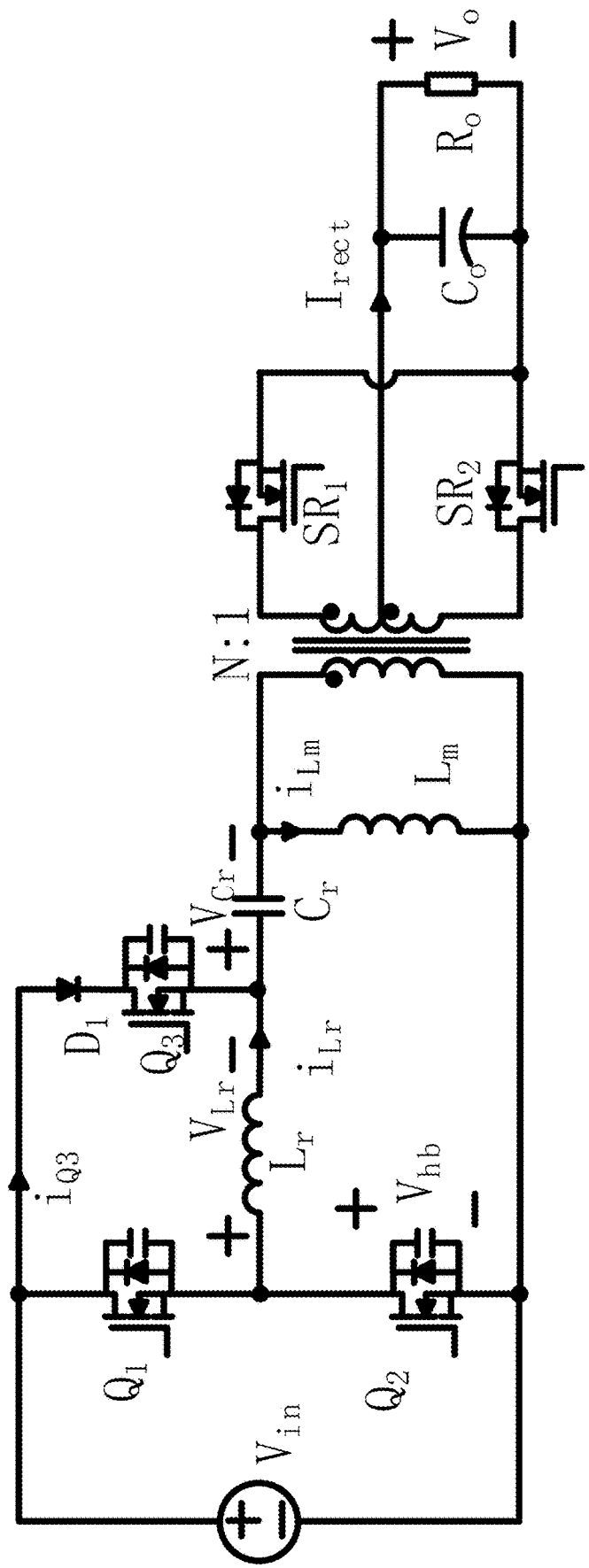

The converter according to the second preferred embodiment shown in FIG. 10 is similar to the converter of the first preferred embodiment of FIG. 9 except that location of switch $Q_3$ and diode $D_1$ is changed. In FIG. 10, switch $Q_3$ and diode $D_1$ are still connected in series but are connected differently. Switch $Q_3$ and diode $D_1$ are connected to the node between the resonant inductor $L_r$ and resonant capacitor $C_r$, but instead of being connected to the negative terminal of the input voltage $V_{in}$, the switch $Q_3$ and diode $D_1$ are connected to the positive terminal of the input voltage $V_{in}$.

Figure 11:
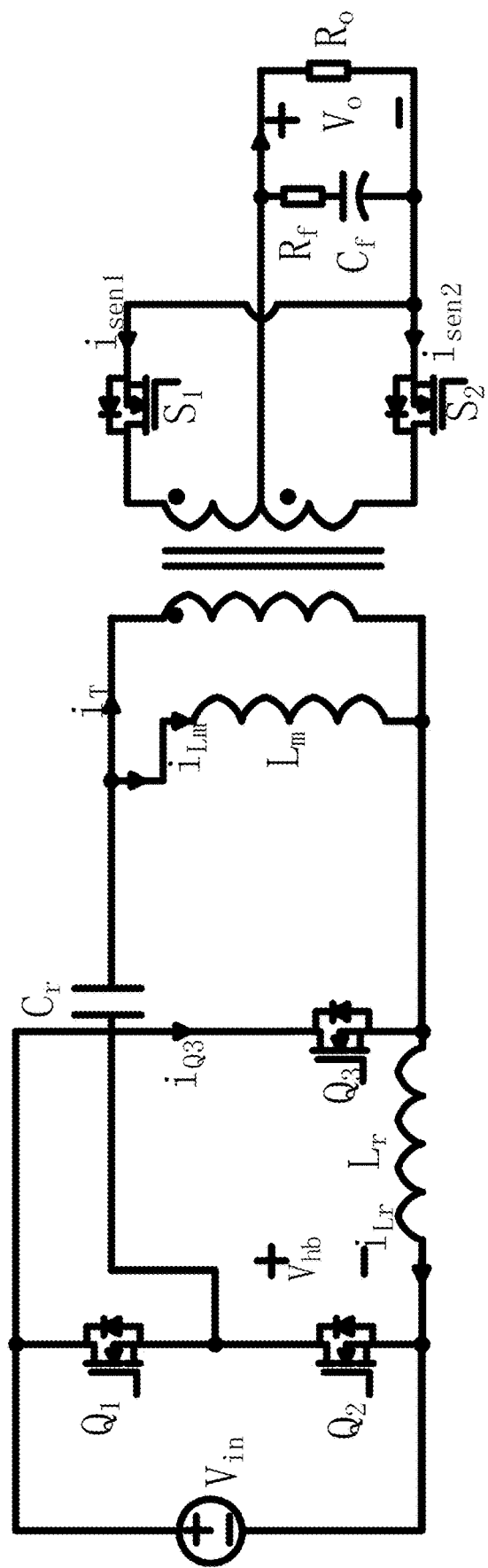
Figure 12:
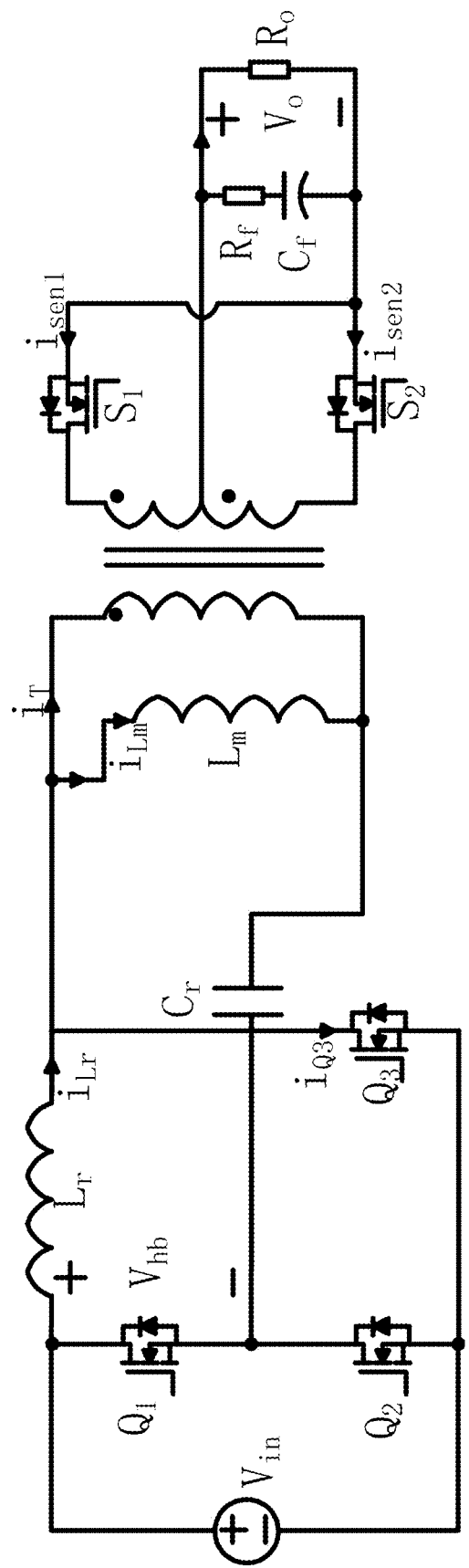

The converters according to the third and fourth preferred embodiments shown in FIGS. 11 and 12 are similar to the converters according to the first and second preferred embodiments shown in FIGS. 9 and 10 except that the resonant inductor $L_r$ and resonant capacitor $C_r$ are not directly connected in series, diode $D_1$ is not needed, and the switch $Q_3$ is connected differently. The body diode of auxiliary switch $Q_3$ cannot be on if the switch voltage is negative. For a half-bridge topology, the resonant capacitor $C_r$ has half the DC voltage plus the high-frequency AC voltage, and there is no negative voltage in FIGS. 11 and 12. Thus, the diode $D_1$ is not needed in FIGS. 11 and 12, but is needed in FIGS. 9 and 10. The current $i_T$ is the current through the primary winding of the transformer. The current $i_{sen1}$ is the current of synchronous rectifiers $S_1$. The current $i_{sen2}$ is the current of synchronous rectifiers $S_2$. The resistance $R_f$ and capacitor $C_f$ define a filter for the output voltage $V_O$.

In FIG. 11, the resonant inductor $L_r$ is connected to the negative terminal of the input voltage $V_{in}$, and the switch $Q_3$ is connected to the positive terminal of the input voltage $V_{in}$.

In FIG. 12, the resonant inductor $L_r$ is connected to the positive terminal of the input voltage $V_{in}$, and the switch $Q_3$ is connected to the negative terminal of the input voltage $V_{in}$. The converter in FIG. 12 provides the most cost saving and requires the least complex driver circuit because there is no auxiliary diode compared with FIGS. 9 and 10 and there is a common ground between the auxiliary switch $Q_3$ and the switch $Q_2$ in FIG. 12, which means the drive circuit is simple and low cost.

Figure 13:
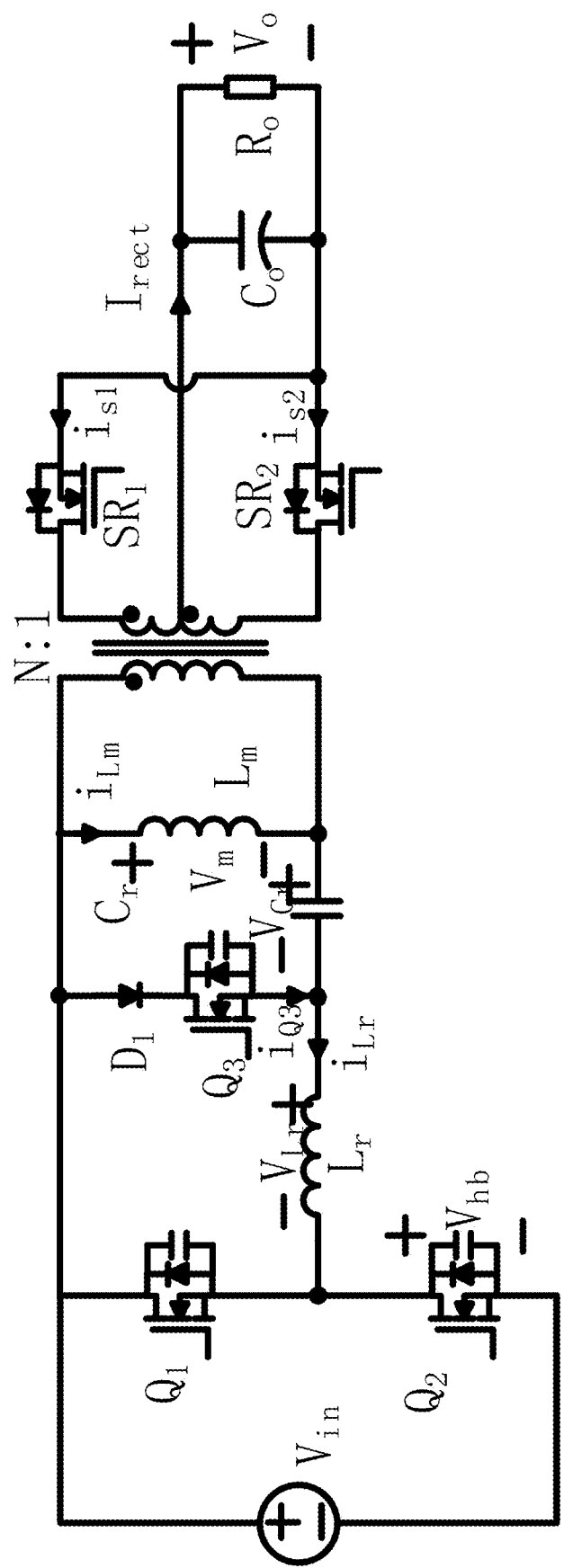

The converter according to the fifth preferred embodiment shown in FIG. 13 is similar to the converter according to the first preferred embodiment shown in FIG. 9 except that each of the series connected diode $D_1$ and switch $Q_3$, the inductor $L_m$, and the transformer are connected to the positive terminal of the input voltage $V_{in}$.

Figure 14:
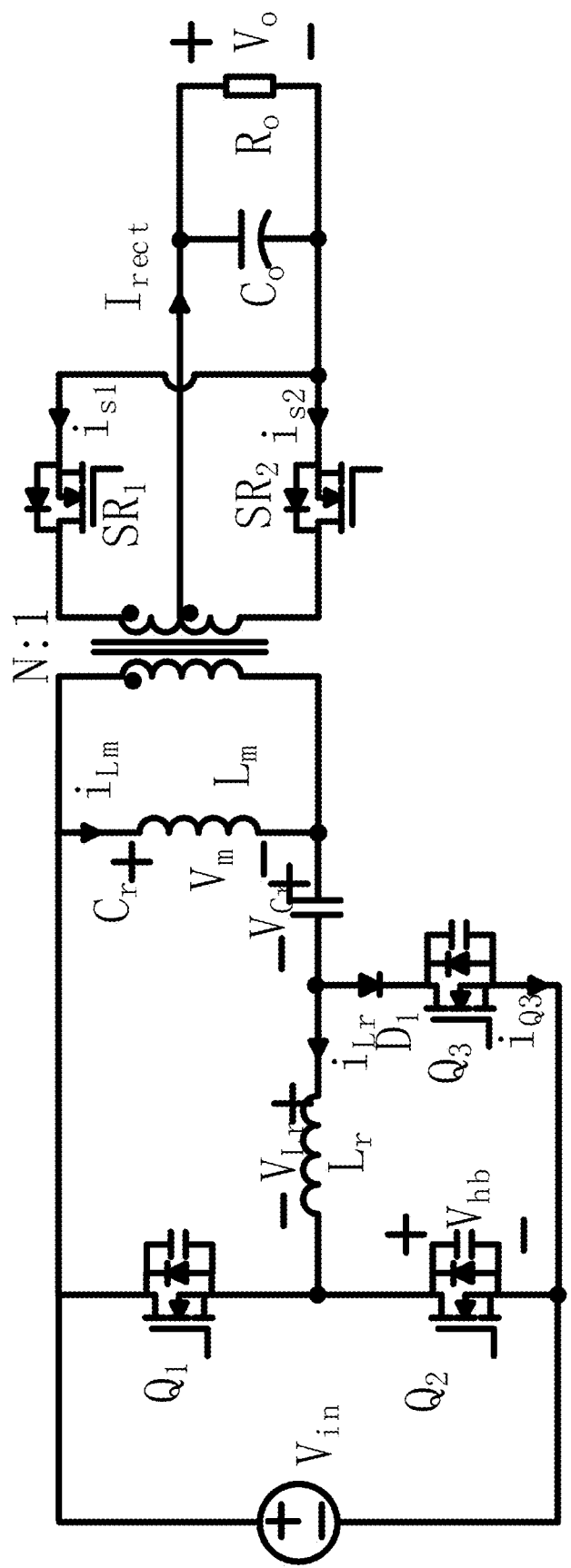

The converter according to the sixth preferred embodiment shown in FIG. 14 is similar to the converter according to the first preferred embodiment shown in FIG. 9 except that each of the inductor $L_m$, and the transformer are connected to the positive terminal of the input voltage $V_{in}$.

Figure 15:
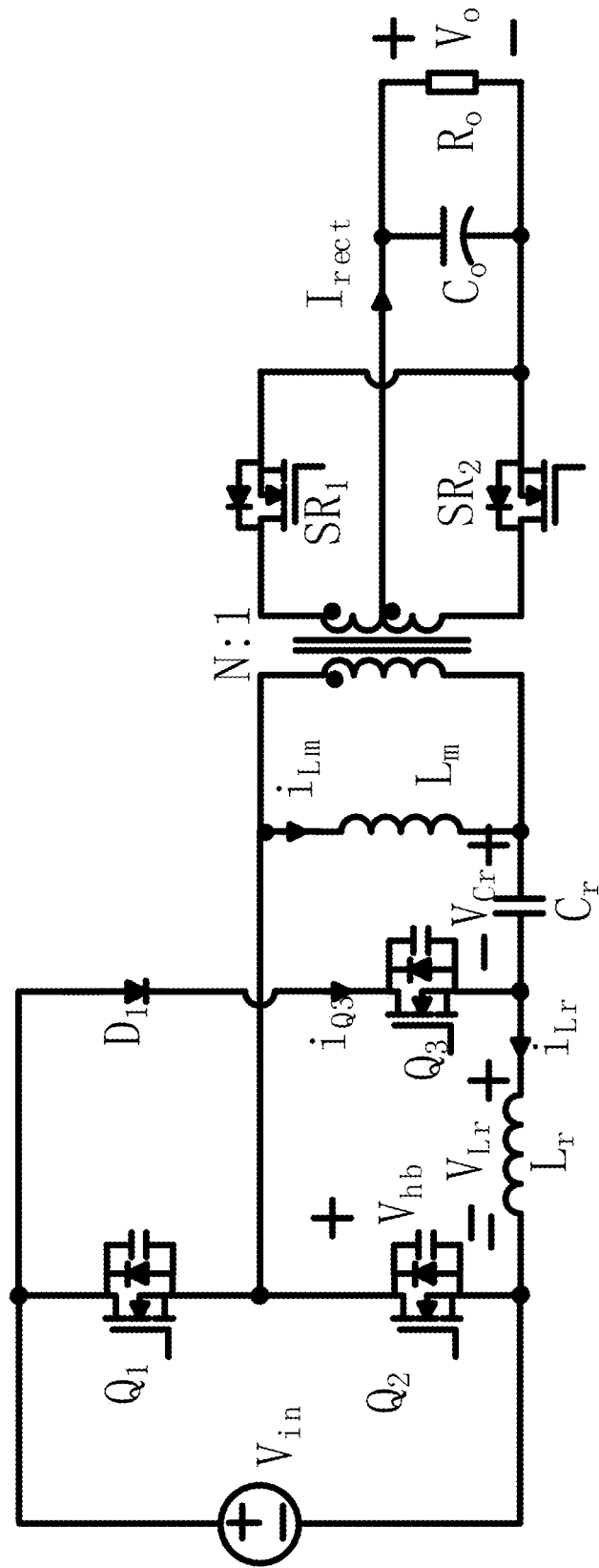

The converter according to the seventh preferred embodiment shown in FIG. 15 is similar to the converter according to the third preferred embodiment shown in FIG. 11 except that the resonant inductor $L_r$ and the resonant capacitor $C_r$ are directly connected in series in between the negative terminal of the input voltage $V_{in}$ and the transformer.

Figure 16:
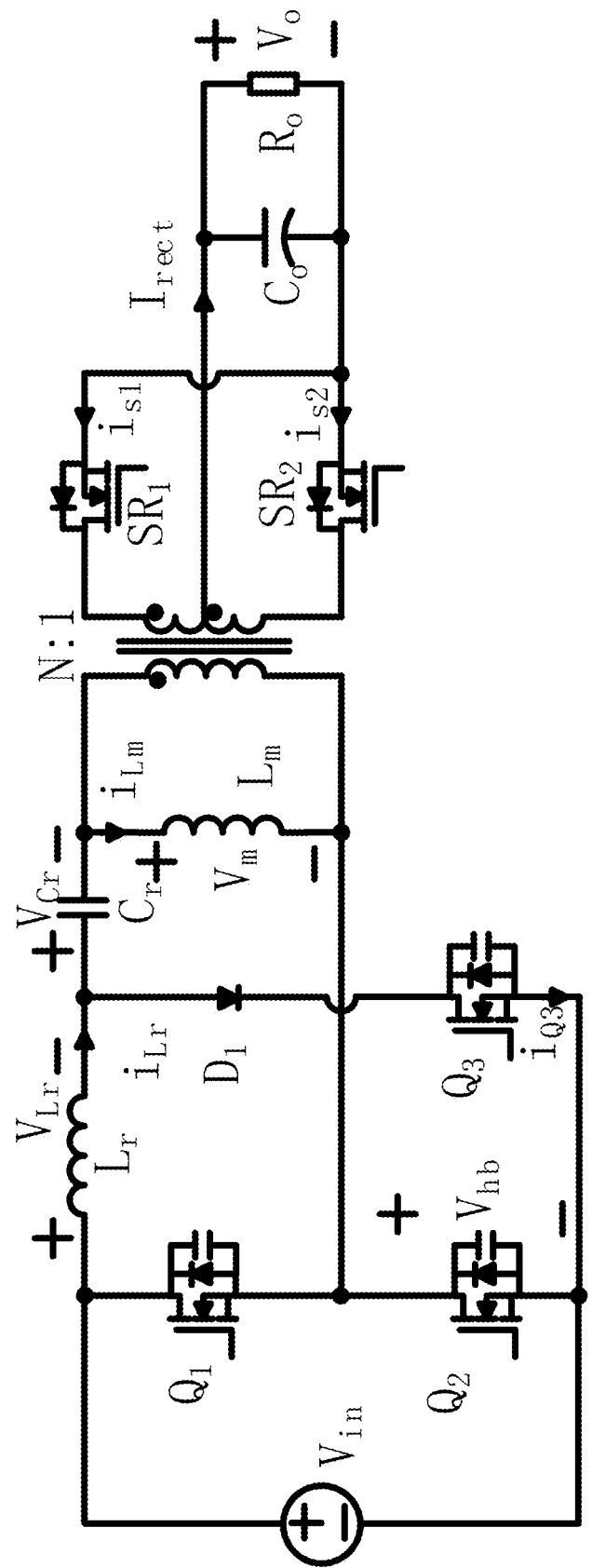

The converter according to the eighth preferred embodiment shown in FIG. 16 is similar to the converter according to the fourth preferred embodiment shown in FIG. 12 except that the resonant inductor $L_r$ and the resonant capacitor $C_r$ are directly connected in series in between the positive terminal of the input voltage $V_{in}$ and the transformer.

Figure 17:
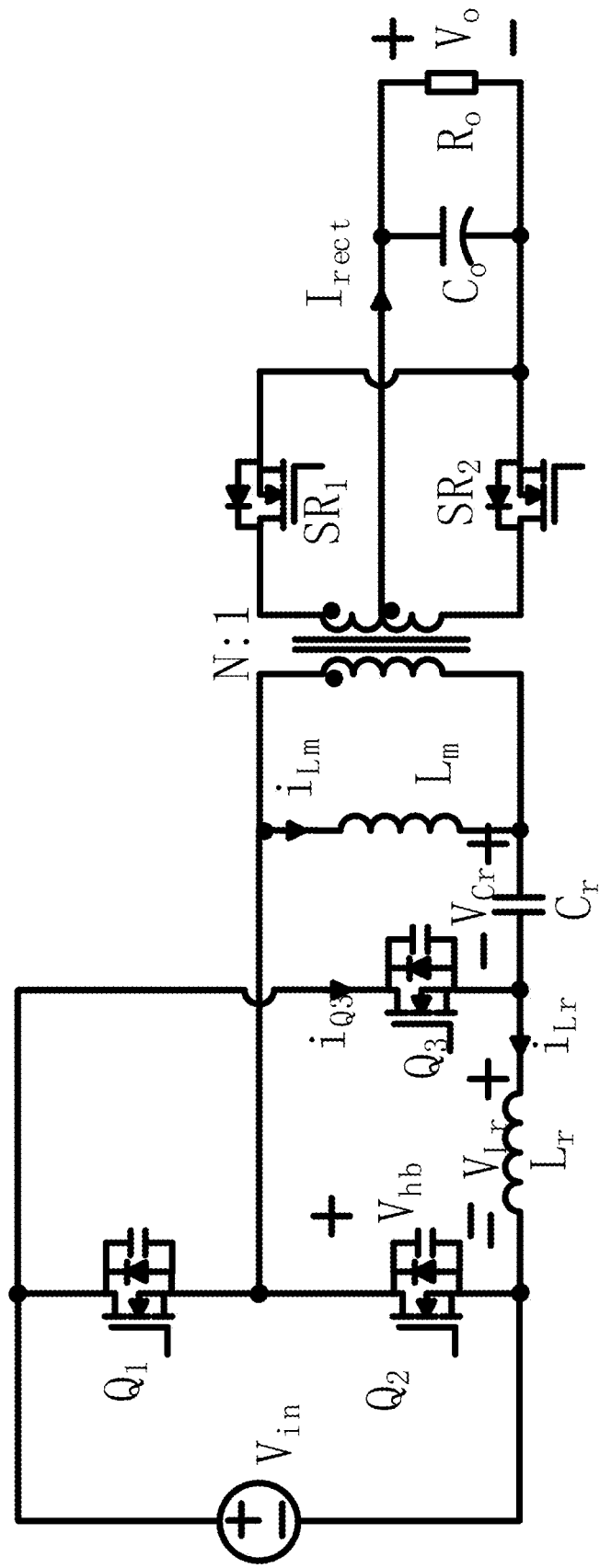

The converter according to the ninth preferred embodiment shown in FIG. 17 is similar to the converter according to the seventh preferred embodiment shown in FIG. 15 except that diode $D_1$ is not used.

Figure 18:
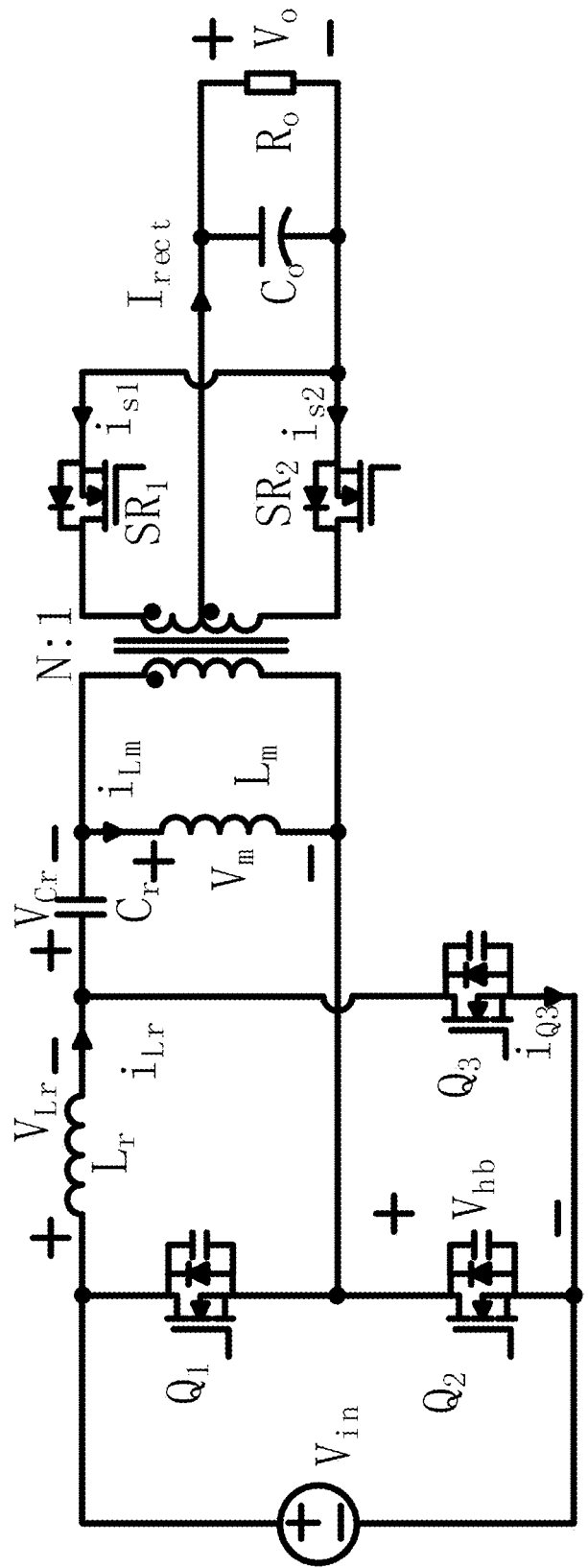

The converter according to the tenth preferred embodiment shown in FIG. 18 is similar to the converter according to the eighth preferred embodiment shown in FIG. 16 except that diode $D_1$ is not used.

As with the converter in FIG. 12, the converter in FIG. 18 provides the most cost saving and requires the least complex driver circuit because there is no auxiliary diode and there is a common ground between switches $Q_2$ and $Q_3$, which means the drive circuit is simple and low cost.

Figure 19:
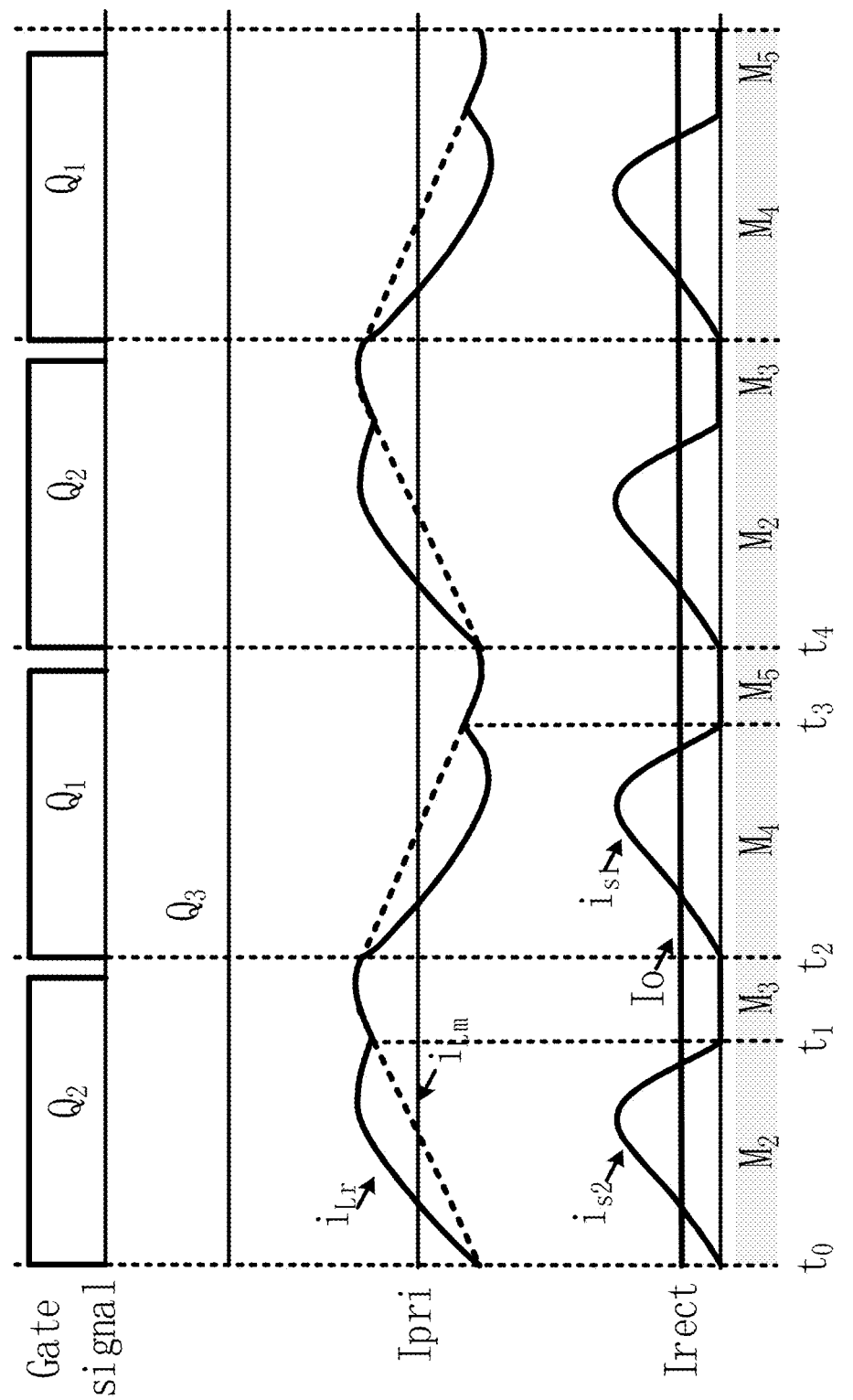
FIG. 19 shows waveforms during normal operation.
Figure 20:
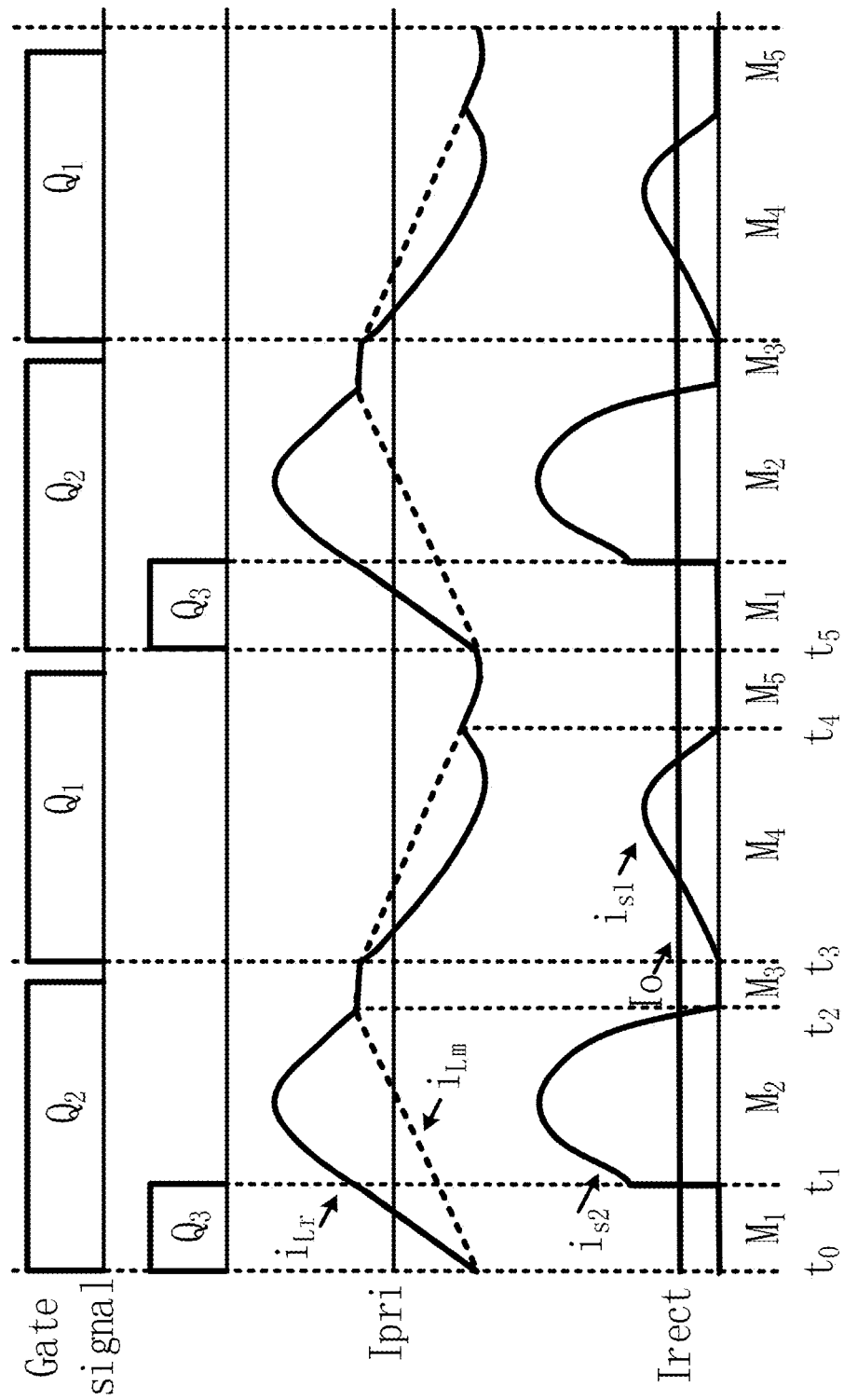
FIG. 20 shows waveforms during hold-up operation.

The operation of converter according to the tenth preferred embodiment is discussed below. The other preferred embodiments operate in a similar manner. FIGS. 19 and 20 show waveforms during normal operation and during hold-up operation (i.e., voltage boost operation). During the normal operation, the converter is operated similar to known converters. FIG. 19 shows the waveforms during normal operation during which the switch $Q_3$ is off. FIG. 20 shows the waveforms during hold-up operation during which the switch $Q_3$ is turned on and off. FIGS. 21-25 show the converter during hold-up operation.

Figure 21:
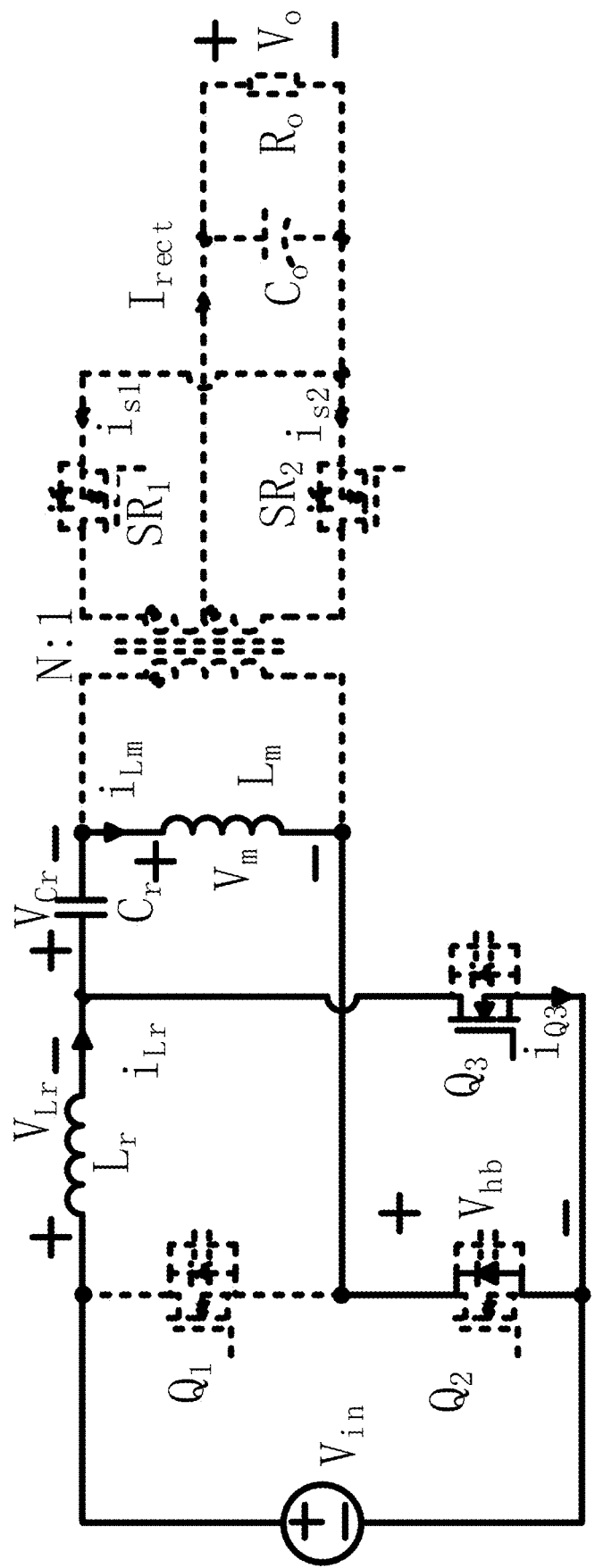
FIGS. 21-25 show the operation of the converter according to the tenth preferred embodiment of the present invention shown in FIG. 18.

FIG. 21 shows the converter during mode 1 (M1). Switches $Q_2$, $Q_3$ are on at $t_0$. The resonant current $i_{Lr}$ increases linearly because of the positive input voltage $V_{in}$ applied to the resonant inductor $L_r$. The magnetic inductor $L_m$ is charged by the resonant capacitor $C_r$. The current flows through switch $Q_3$ and the body diode of switch $Q_2$.

Figure 22:
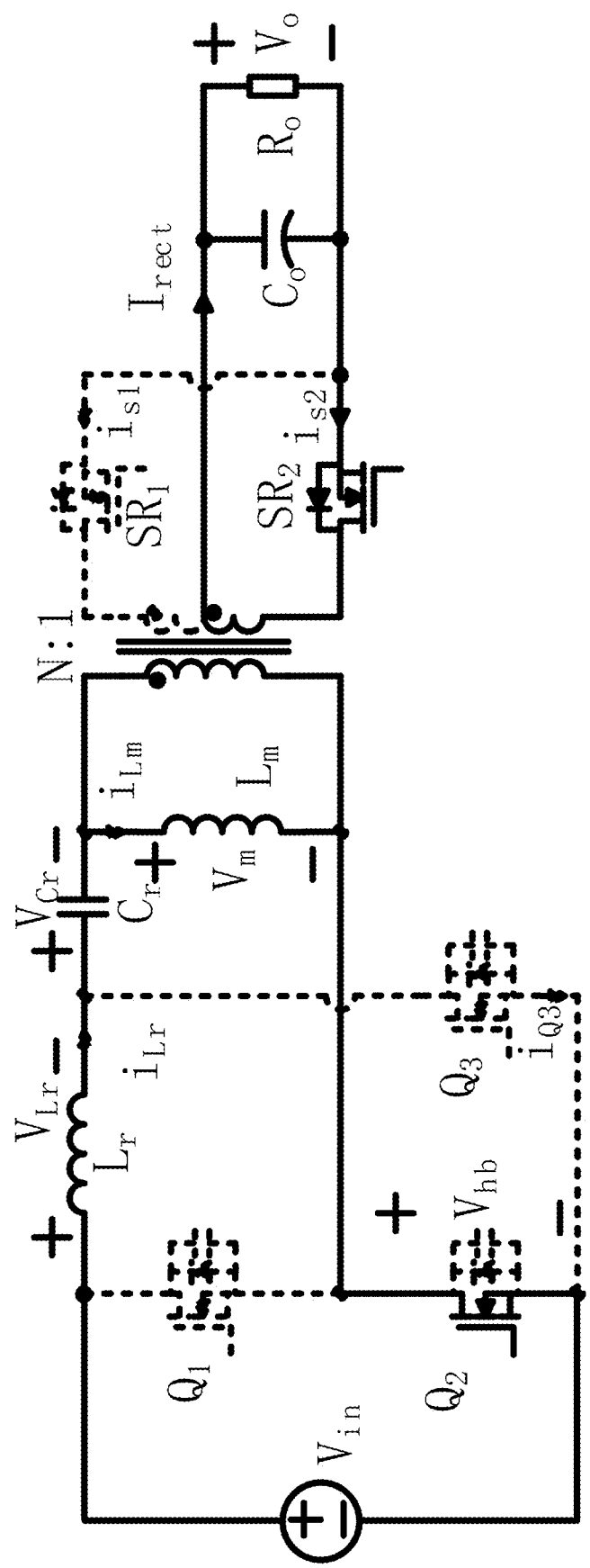

FIG. 22 shows the converter during mode 2 (M2). Switch $Q_3$ is off at $t_1$. The large resonant current flows through the resonant capacitor $C_r$, magnetic inductor $L_m$, the transformer, and switch $Q_2$. The large rectifier current charges the output capacitor $C_O$ through synchronous rectifier $SR_2$.

Figure 23:
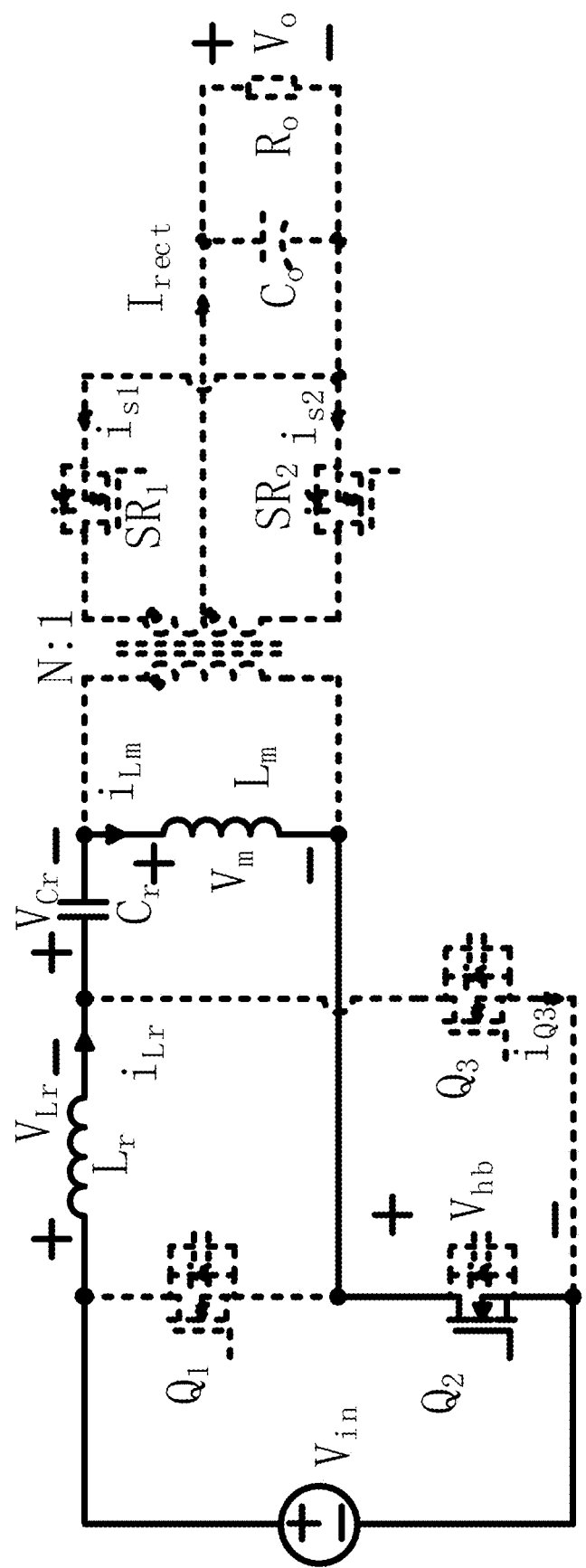

FIG. 23 shows the converter during mode 3 (M3). At time=$t_2$, the current flowing through the secondary-side of the transformer reaches zero as shown in FIG. 20. The converter enters an idle mode where no power is being transferred from the input to the output. Three components, resonant inductor $L_r$, resonant capacitor $C_r$, and magnetic inductor $L_m$, resonate.

Figure 24:
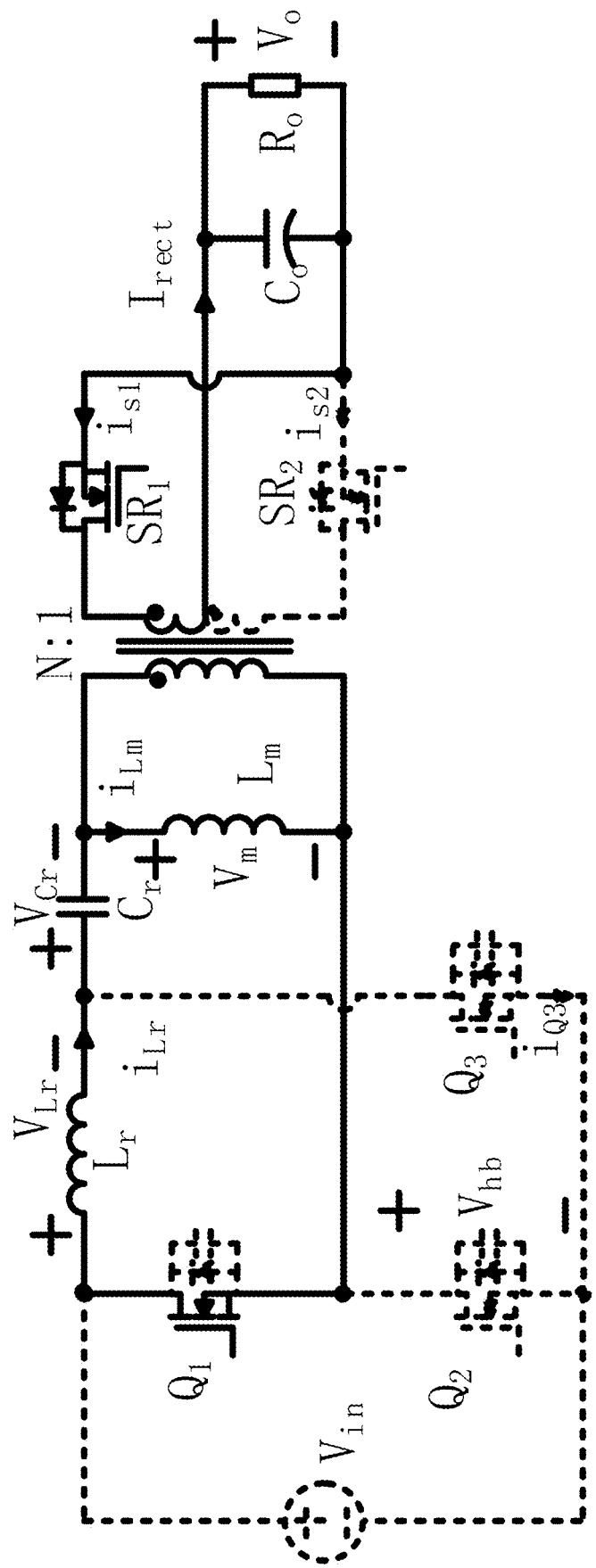

FIG. 24 shows the converter during mode 4 (M4). At time=$t_3$, the switch $Q_2$ turns off and the switch $Q_1$ turns on. The primary-side voltage Vm is clamped to N*Vo; the input energy is transmitted to the secondary side. Operation during M4 is similar to known converters.

Figure 25:
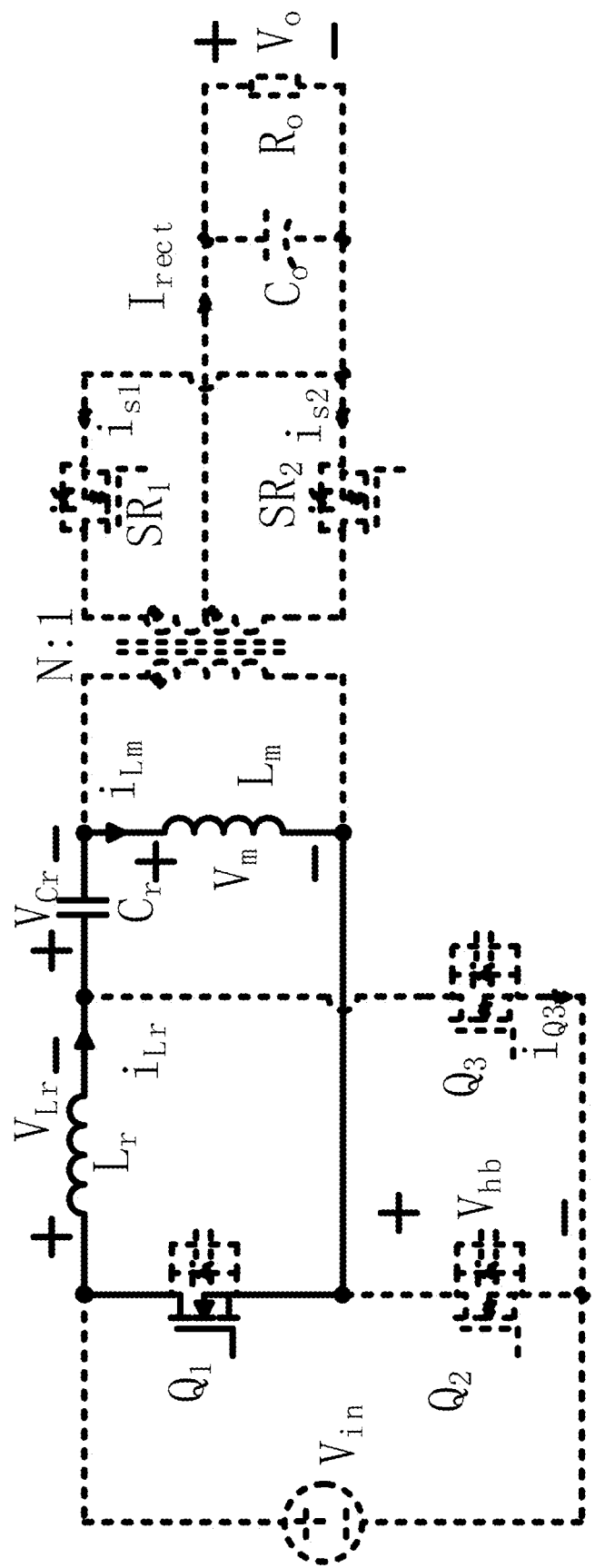

FIG. 25 shows the converter during mode 5 (M5). At time=$t_4$, the current flowing through the secondary side of transformer reaches zero. The converter enters an idle mode where no power is being transferred from the input to the output. Three components, resonant inductor $L_r$, resonant capacitor $C_r$, and magnetic inductor $L_m$, resonate.

Figure 26:
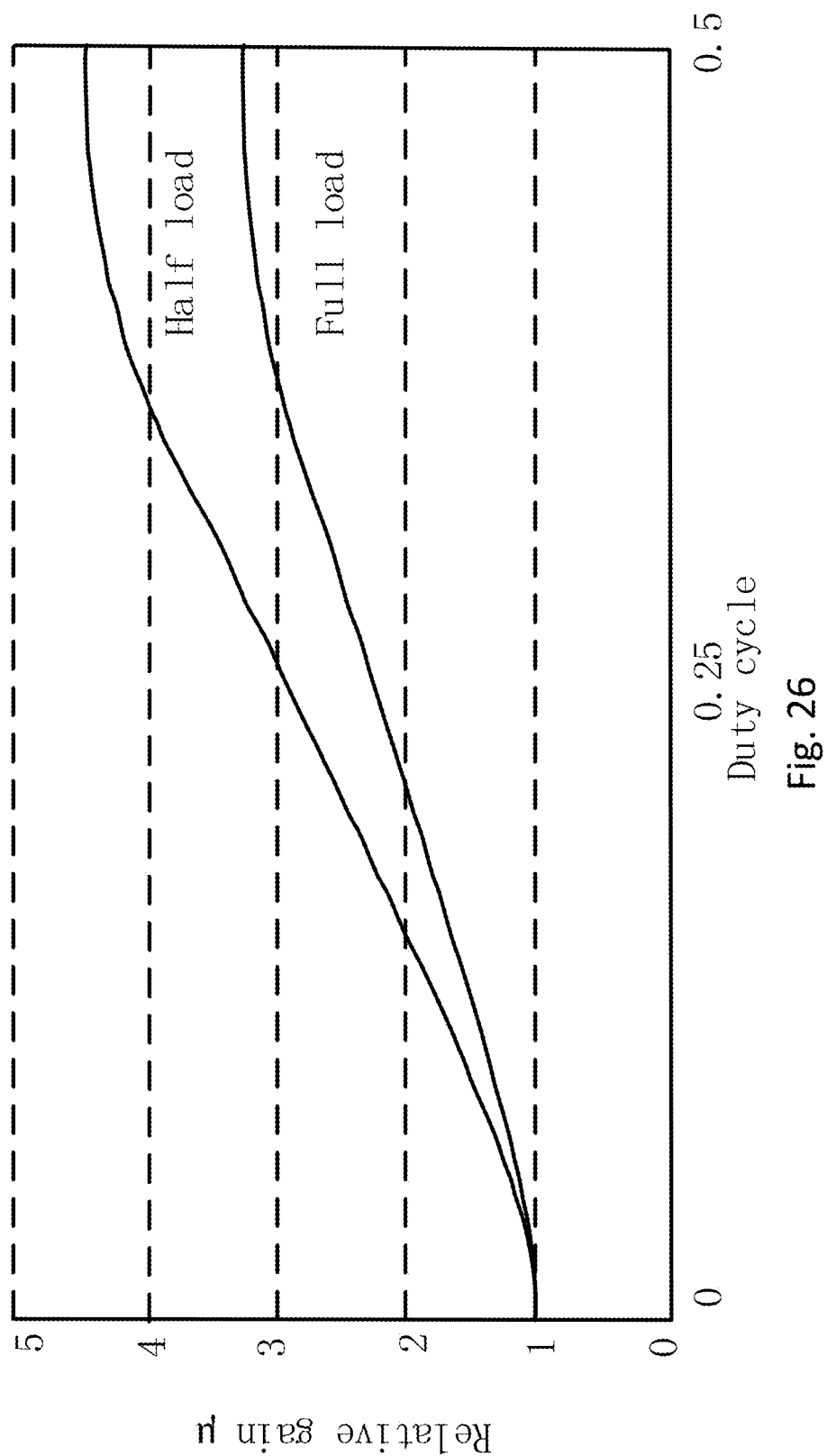
FIG. 26 shows relative gain of converter as a function of duty cycle of the additional switch.

The converter has two different input-output voltage conversion ratios depending on the converter's operational state. During normal operation, the converter has the same operational characteristic as known converters. FIG. 26 shows the simulated relationship of the voltage gain and the duty cycle of the switch $Q_3$ in which the switching frequency is maintained at the minimum frequency $f_{min}$. The duty cycle of the switch $Q_3$ is defined as the ratio of the on time of the switch $Q_3$ over the switching period of the minimum frequency ($1/Fs_{min}$).

During hold-up operation, the switching frequency is fixed at the minimum frequency. Increasing the duty cycle of the switch Q3 boosts the relative gain. The relative gain is 3.2 at full load and 4.5 at half load.

For example, the converter according to a preferred embodiment of the present invention can provide the proper output voltage when the input voltage is between 330 V and 400 V (normal operating conditions) at full load. When the input voltage is between 250 V and 330 V, voltage boost mode can be used. Thus, 1.5× gain is enough for hold-up operation.

Experimental results are shown in FIGS. 27-32. A 300-W, 12-V-output prototype was built according to Table 1. The duty cycle was limited to 15%.

TABLE 1

| | |
|---|---|
| Switching frequency | 150 KHZ-270 KHZ |
| Input voltage | 330 V-400 V LLC |
| | 250 V minimum voltage |
| Rated power | 300 W |
| Transformer turn ratio N | 17:1:1 |
| Magnetic Inductance (Lm) | 250 uH |
| Series Inductance (Lr) | 16.5 uH |
| Series Capacitance (Cr) | 23.5 nF |
| Output capacitance | 800 uF |

Figure 27:
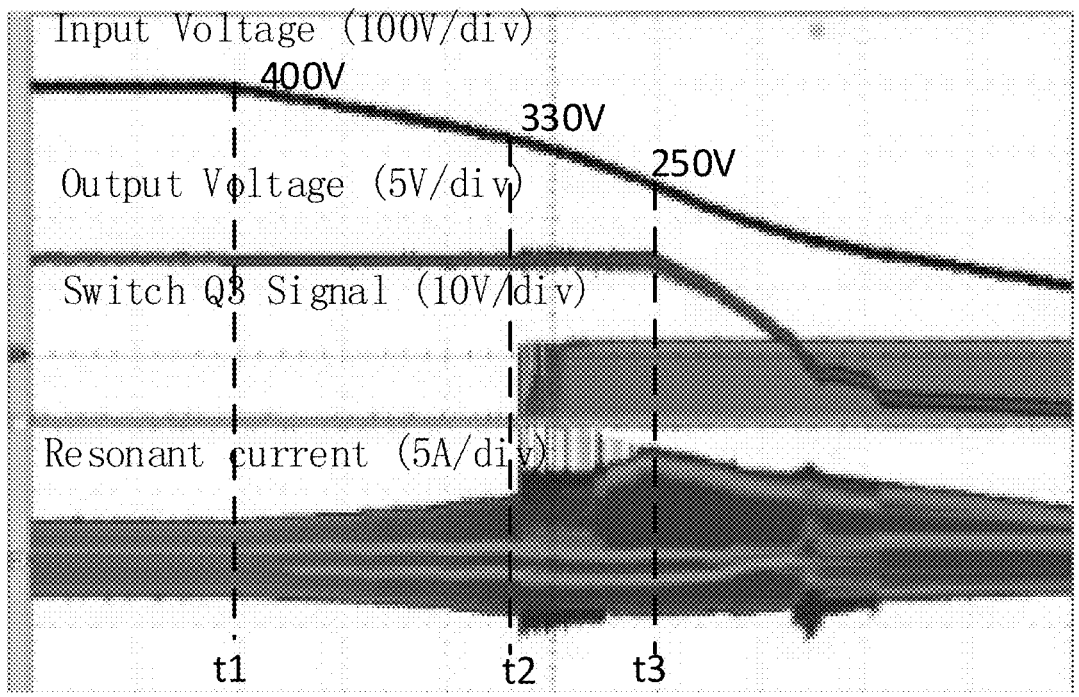
FIGS. 27-29 show waveforms for a converter tested under a 25 A load current.
Figure 28:
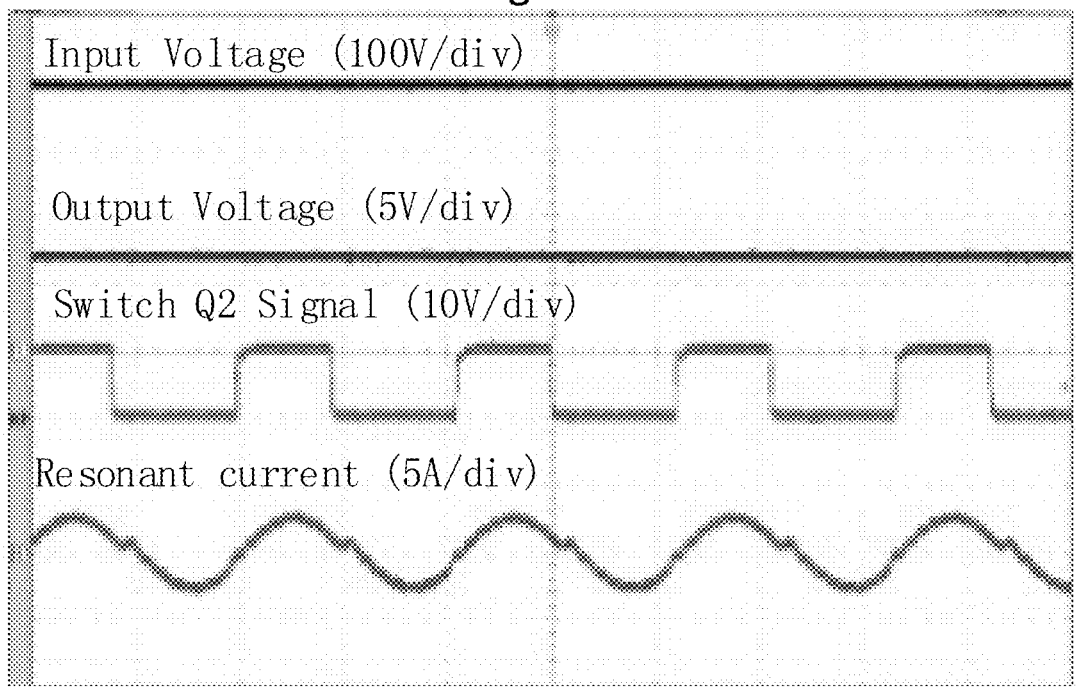
Figure 29:
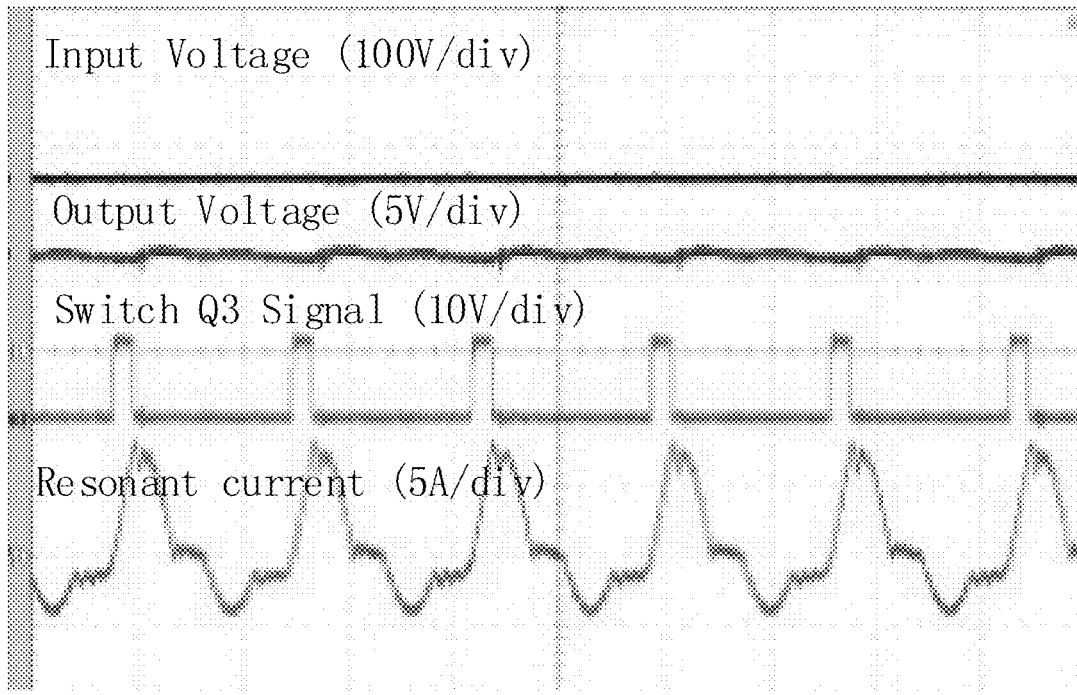

FIGS. 27-29 show the results of the prototype under a 25 A load current from normal operation to hold-up operation. The input voltage is reduced from 400 V at $t_1$ to 250 V at $t_3$.

During time $t_1$ to $t_2$, the prototype provides the nominal output voltage (i.e., 12 V). As shown in FIG. 27, when the input voltage is decreased below 330 V, the additional switch starts operating during time $t_2$ to $t_3$. The output voltage remains at 12 V during the hold-up operation. FIG. 28 shows waveforms when the input voltage is 400 V (i.e., normal operation), and FIG. 29 shows waveforms when the input voltage is 250 V (i.e., hold-up operation). The peak value of the resonant current is 3 A at time $t_1$ when the input voltage is 400 V and is 7.5 A at time $t_3$ when the input voltage is 250 V.

Figure 30:
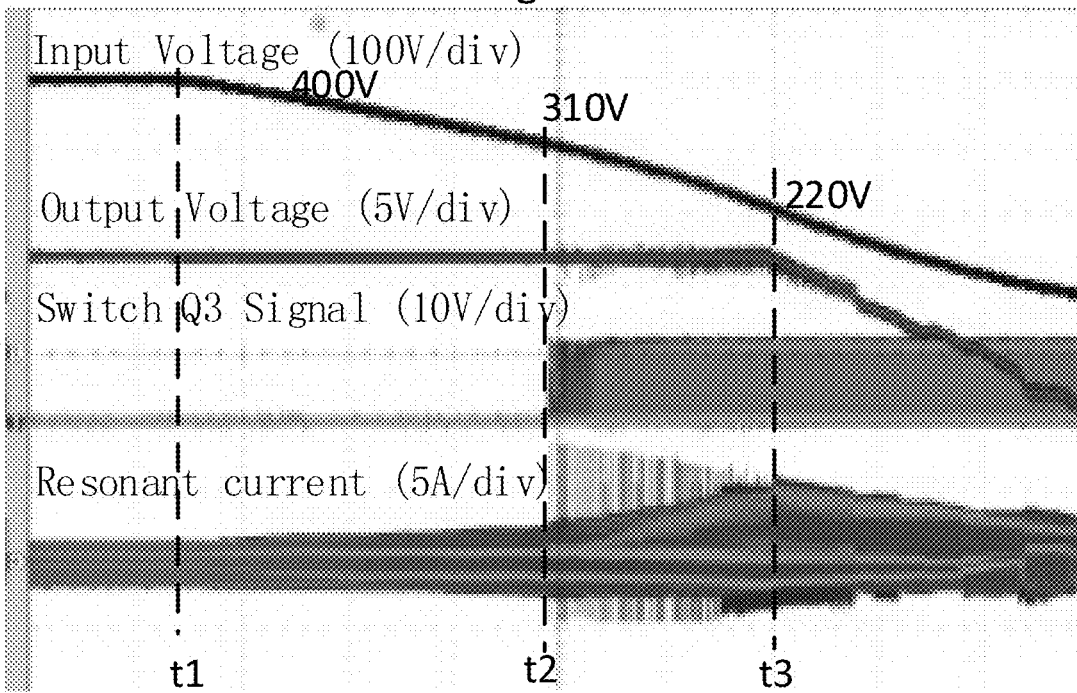
FIGS. 30-32 show waveforms for a converter tested under a 15 A load current.
Figure 31:
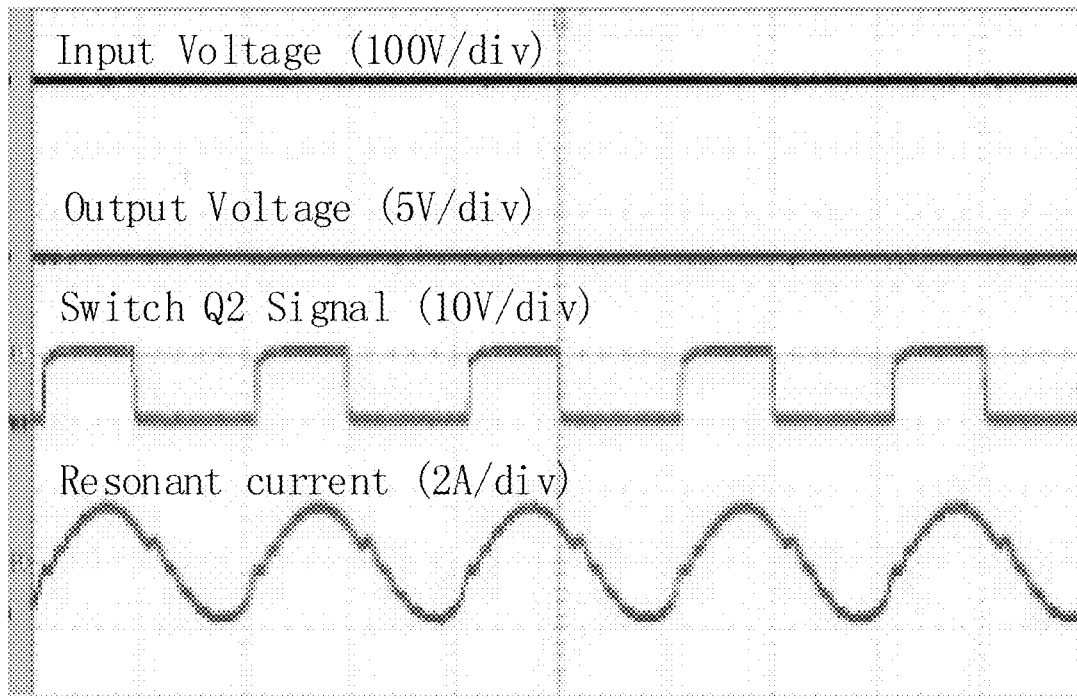
Figure 32:
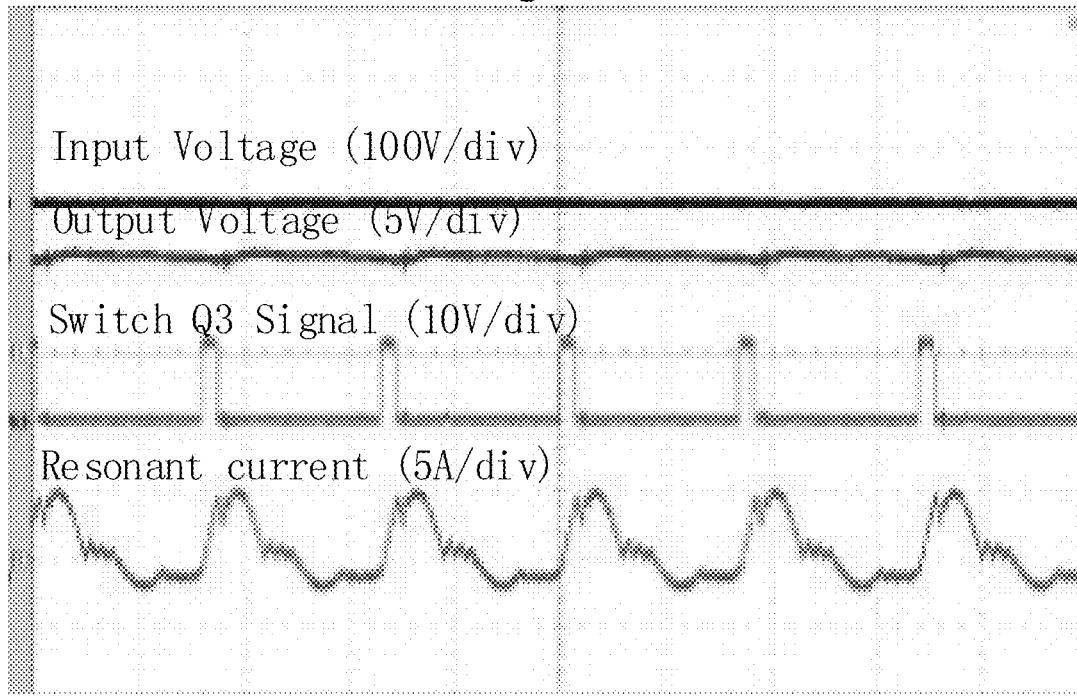

FIGS. 30-32 show the results of the prototype under a 15 A load current from normal operation to hold-up operation. The input voltage is reduced from 400 V at $t_1$ to 250 V at $t_3$.

During time $t_1$ to $t_2$, the prototype provides the nominal output voltage (i.e., 12 V). As shown in FIG. 30, when the input voltage is decreased below 310 V, the additional switch starts operating during time $t_2$ to $t_3$. The output voltage remains at 12 V during the hold-up operation. FIG. 31 shows waveforms when the input voltage is 400 V (i.e., normal operation), and FIG. 29 shows waveforms when the input voltage is 220 V (i.e., hold-up operation). The peak value of the resonant current is 1.8 A at time $t_1$ when the input voltage is 400 V and is 5 A at time $t_3$ when the input voltage is 220 V.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:
    a voltage input;
    a transformer including primary and secondary windings;
    a voltage output;
    a primary circuit connected to the voltage input and to the primary winding, the primary circuit including:
        a half-bridge circuit including first and second transistors that are connected in series, the half-bridge circuit is connected in parallel with the voltage input and includes a node connected to both the first and second transistors;
        a resonant inductor connected to the half-bridge circuit and the primary winding;
        a resonant capacitor connected to the half-bridge circuit and the primary winding; and
        a third transistor with a first terminal connected to the half-bridge circuit and a second terminal directly connected to a first terminal of the resonant inductor; and
    a secondary circuit connected to the secondary winding and to the voltage output, the secondary circuit including a rectification stage that is connected to the secondary winding and that includes first and second synchronous rectifiers; wherein
    the rectification stage does not use discrete diodes to provide rectification;
    during normal operation, the third transistor is turned off; and
    during voltage boost operation, the third transistor is turned on and off to maintain an output voltage level by delivering energy both when the first transistor is on and the second transistor is off and when the second transistor is on and the first transistor is off.

2. The converter of claim 1, further comprising a diode connected to the third transistor.

3. The converter of claim 1, wherein:
    the second terminal of the third transistor is also directly connected to a first terminal of the resonant capacitor;
    the first terminal of the resonant inductor and the first terminal of the resonant capacitor are connected such that the resonant capacitor is connected to the half-bridge circuit through the resonant inductor;
    a second terminal of the resonant inductor is connected to the node of the half-bridge circuit; and
    a second terminal of the resonant capacitor is connected to the primary winding.

4. The converter of claim 3, wherein the first terminal of the third transistor is also connected to a negative terminal of the voltage input.

5. The converter of claim 4, wherein the primary winding is directly connected to the negative terminal of the input voltage.

6. The converter of claim 4, wherein the primary winding is directly connected to a positive terminal of the input voltage.

7. The converter of claim 3, wherein the first terminal of the third transistor is also connected to a positive terminal of the voltage input.

8. The converter of claim 7, wherein the primary winding is directly connected to the negative terminal of the input voltage.

9. The converter of claim 7, wherein the primary winding is directly connected to a positive terminal of the input voltage.

10. The converter of claim 1, wherein:
   the second terminal of the third transistor is also directly connected to a first terminal of the resonant capacitor;
   the first terminal of the resonant inductor and the first terminal of the resonant capacitor are connected such that the resonant capacitor is connected to the half-bridge circuit through the resonant inductor;
   a second terminal of the resonant inductor is connected to a negative terminal of the input voltage; and
   a second terminal of the resonant capacitor is connected to the primary winding.

11. The converter of claim 10, wherein the first terminal of the third transistor is also connected to a positive terminal of the voltage input.

12. The converter of claim 11, further comprising a diode connected to the third transistor.

13. The converter of claim 1, wherein:
   the second terminal of the third transistor is also directly connected to a first terminal of the resonant capacitor;
   the first terminal of the resonant inductor and the first terminal of the resonant capacitor are connected such that the resonant capacitor is connected to the half-bridge circuit through the resonant inductor;
   a second terminal of the resonant inductor is connected to a positive terminal of the input voltage; and
   a second terminal of the resonant capacitor is connected to the primary winding.

14. The converter of claim 13, wherein the first terminal of the third transistor is also connected to a negative terminal of the voltage input.

15. The converter of claim 14, further comprising a diode connected to the third transistor.

16. The converter of claim 1, wherein:
   the second terminal of the third transistor is also connected to the primary winding;
   a first terminal of the resonant capacitor is connected to the node of the half-bridge circuit; and
   a second terminal of the resonant capacitor is connected to the primary winding.

17. The converter of claim 16, wherein:
   a second terminal of the resonant inductor is connected to a negative terminal of the input voltage; and
   the first terminal of the third transistor is also connected to a positive terminal of the input voltage.

18. The converter of claim 16, wherein:
   a second terminal of the resonant inductor is connected to a positive terminal of the input voltage; and
   the first terminal of the third transistor is also connected to a negative terminal of the input voltage.

19. The converter of claim 1, wherein voltage boost operation occurs during a hold-up period when the input voltage is below a threshold voltage.

20. The converter of claim 1, wherein, during voltage boost operation, the resonant capacitor boosts energy of the resonant inductor to maintain the output voltage level.

* * * * *